United States Patent [19]

Benton et al.

[11] Patent Number: 4,926,325

[45] Date of Patent: May 15, 1990

[54] APPARATUS FOR CARRYING OUT FINANCIAL TRANSACTIONS VIA A FACSIMILE MACHINE

[75] Inventors: William M. Benton, Fort Lauderdale; William Mee, Pompano Beach, both of Fla.

[73] Assignee: Moneyfax, Inc., Ft. Lauderdale, Fla.

[21] Appl. No.: 236,614

[22] Filed: Aug. 23, 1988

[51] Int. Cl.$^5$ .................. G06F 15/21; G06F 13/00
[52] U.S. Cl. .................. 364/408; 340/825.29; 340/825.33
[58] Field of Search .............. 364/406, 408; 358/257, 358/280; 235/379–383; 340/825.29, 825.33

[56] References Cited

U.S. PATENT DOCUMENTS

| | | | |
|---|---|---|---|
| 3,652,795 | 3/1972 | Wolf et al. | 364/406 |
| 4,277,837 | 7/1981 | Stuckert | 364/900 |
| 4,305,059 | 12/1981 | Benton | 340/825.33 |
| 4,341,951 | 7/1982 | Benton | 235/379 |
| 4,454,414 | 11/1986 | Benton | 364/408 |
| 4,594,663 | 6/1986 | Nagata et al. | 364/406 |
| 4,625,276 | 6/1984 | Benton | 235/379 |
| 4,661,857 | 4/1987 | Kondo | 358/257 |
| 4,699,532 | 10/1987 | Smith | 364/406 |

*Primary Examiner*—Jerry Smith
*Assistant Examiner*—Gail O. Hayes

*Attorney, Agent, or Firm*—Lowe, Price, LeBlanc, Becker & Shur

[57] ABSTRACT

Financial transactions between buyers and sellers are carried out using at least one facsimile machine improved in accordance with the invention both to transfer electronic funds data among the buyer, seller and an authorizing institution and to print transaction records. Each buyer and seller is provided with an identification module, which may be in the form of a card of a mechanical key containing an integrated circuit "chip" that is inserted into a receptacle provided in the facsimile machine. Each module stores data corresponding to an account number, transaction summaries, an account balance, signature and other information. The machine in turn contains circuitry to communicate bidirectionally with the identification module and, via telephone lines, with modules provided at other facsimile machines. In a "local" mode of operation, buyer and seller modules are placed into communication with each other at a single facsimile machine which authorizes and carries out a requested transaction between the modules, and prints out a transaction record. In a "remote" mode of operation, modules at remote facsimile machines communicate with each other via telephone lines, with a transaction record being printed at each end. In an "upload" mode, transaction data accumulated at each machine is transmitted to the authorizing institution.

30 Claims, 37 Drawing Sheets

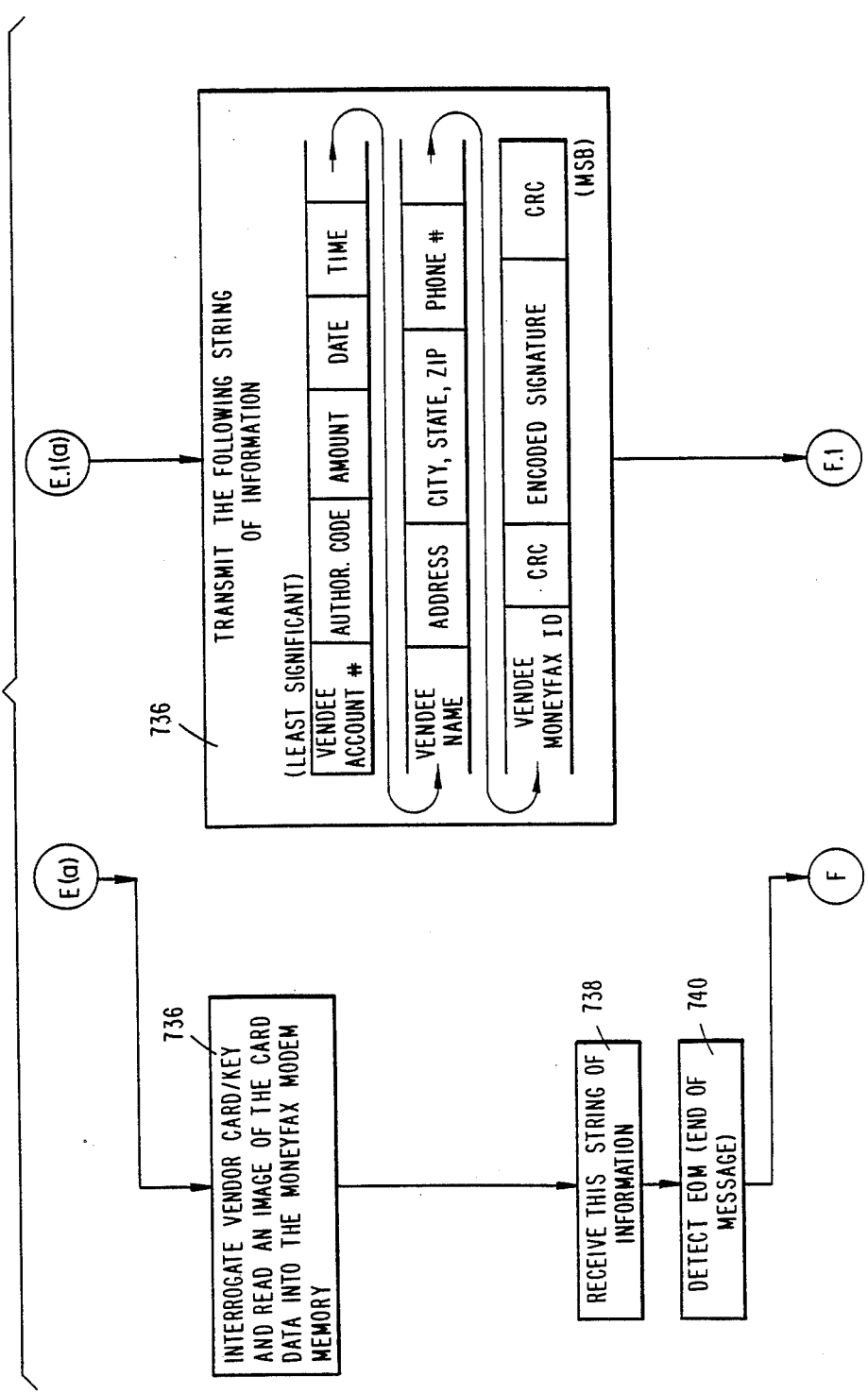

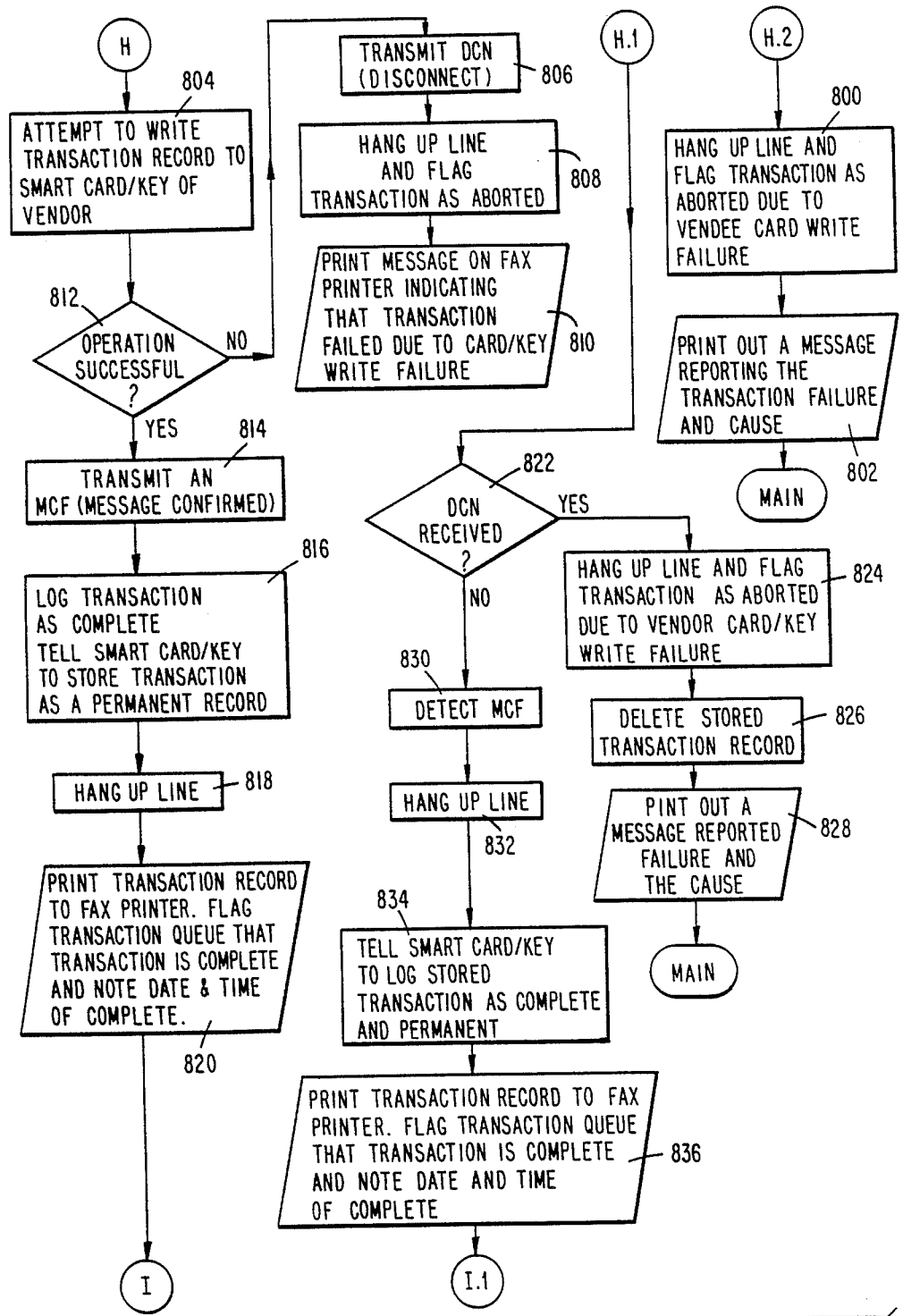
FIG. II-5

APPARATUS FOR CARRYING OUT FINANCIAL TRANSACTIONS VIA A FACSIMILE MACHINE

CROSS-REFERENCES TO RELATED APPLICATIONS

This invention is related to the subject matter of U.S. Pat. Nos. 4,305,059; 4,341,951; 4,454,414 and 4,625,276, all assigned to the assignee of this invention.

TECHNICAL FIELD

This invention relates generally to electronic funds transfer systems, and more particularly to a unique electronic funds transfer system incorporating facsimile machines both to transfer funds data between buyers and sellers at a common point of sale or at remote locations and to print transaction records including facsimile signatures of the parties.

BACKGROUND ART

Spurred by the pressures of paper-based checking which is costly and time consuming for financial institutions and further in light of the inconvenience of maintaining accurate accounting in cash transactions, institutions have sought out and experimented with various electronic means of extending and speeding up account accessibility. To this end and to improve record keeping as well as to reduce flow of actual cash, computer technology has been applied to develop electronic funds transfer, which is essentially a process of value exchange achieved through electronic devices. Examples of electronic funds transfer equipment that have become used on a substantial basis in recent years are the Automated Clearing House (ACH), the Automated Teller Machine (ATM) and the point of sale system (POS).

To eliminate the presence of a central computer in every transaction, there has been a trend toward offline electronic funds transfer, that is, transfer of data between portable and resident units, with only periodic downloading of data to the central computer. In Mareno U.S. Pat. No. 4,007,355, for example, cashless transactions are made between credit cards through a special interface located at each vendor station. Stuckert U.S. Pat. No. 4,277,837 is directed toward a cashless, off-line transaction system involving portable units that are carried by customers and adapted for use with data storage and transfer cards.

The Mareno and Stuckert systems have particular problems that have limited their widespread use in off-line electric funds transfer. In Mareno, no exchange of funds may be made arbitrarily because the cards carried by each user, although having funds data storage capability, have no keyboards and require a special interface apparatus to be present at each transaction. In Stuckert, cards used with the portable terminals have no display; a separate portable terminal must be involved during each transaction. The user cannot continuously monitor his account, limiting the versatility of the system.

These problems and others were solved by Benton in U.S. Pat. No. 4,305,059 issued on Dec. 8, 1981, disclosing a modular funds transfer system wherein each user as well as vendor carries an identical portable module having a keyboard and a display. Funds are transferred between modules using a hard wire interface, and the account status stored in each module is updated following each transaction. In another patent to Benton U.S. Pat. No. 4,341,951, printed vouchers are issued by the portable module following each transaction.

The Benton approach was further refined in U.S. Pat. No. 4,454,414 to provide bidirectional optical coupling between portable funds data transfer modules, including a "hand-shaking" protocol that enables funds transfer to be completed only if a number of criteria are satisfied. These criteria include an identification check following keyboard entry by the user of a secret number and examination of the transaction amount to ensure that it falls within credit limits. Finally, in Benton et al. U.S. Pat. No. 4,625,276, electronic funds data are transferred between portable modules either directly in a local mode of operation or indirectly, via telephone lines, in a remote mode of operation. Transaction records are printed by an outboard printer or downloaded to a central computer.

The system described in the aforementioned Benton et al. patents is capable of having a substantial impact on the manner by which financial transactions are carried out, securely transferring funds between buyers and sellers while simultaneously printing supporting documents. However, considerable dedicated apparatus including a modem and printer as well as portable modules are required to implement the system. The present invention is provided to reduce the cost of implementation, and to improve availability, of the system to buyers and sellers.

There currently are more than two million facsimile machines throughout the world, used exclusively for the transfer of documentary information between individual stations connected to any dial up telephone line. Such machines, with printer and keypad as well as a modem, are capable of transmitting and receiving graphical data, e.g., images as well as textual data. This invention is a modification to and implementation of a conventional facsimile machine to be operative in a transaction mode of operation for carrying out transactions between buyers and sellers.

DISCLOSURE OF THE INVENTION

It accordingly is an object of the invention to provide electronic funds data transfer between local or remote parties to a transaction while printing transaction records for the parties.

Another object of the invention is to provide a system for carrying out funds data transfer between either local or remote parties to a transaction while printing individual, "mirrored", transaction records for the parties.

Another object of the invention is to provide a system for carrying out funds data transfer between buyers and sellers, and printing of transaction records including the signatures of the parties, all from data stored in data storage modules provided thereto.

A further object is to provide a system for carrying out financial transactions via a facsimile machine.

Another object of the invention is to use at least one facsimile machine to carry out financial transactions between buyers and sellers at a common location, in a local mode of operation, or at different locations, in a remote mode, and wherein mirrored transaction records are printed by the facsimile machine or machines.

A further object is to provide a funds transfer system using at least one facsimile machine to establish bidirectional communications between portable identification modules carried by buyers and sellers.

A still further object of the invention is to provide a funds transfer system wherein buyers and sellers carry portable identification modules containing identification and account data, and facsimile machines are used to transfer transaction data between the modules and to print transaction records.

Yet another object of the invention is to provide a funds transfer system wherein buyers and sellers carry portable identification modules containing identification and account data, and facsimile machines are used to transfer transaction data between the modules and to a central computer, and mirrored transaction records are printed for completed transactions.

Another object is to provide a funds transfer system using facsimile machines to transfer data between identification modules provided to buyers and sellers, wherein a processor provided with each facsimile machine controls communication between modules, authorizes transactions and updates data stored in each module in accordance with the transaction.

Yet another object is to provide a system for carrying out transactions between buyers and sellers wherein portable identification modules carried by each communicate bidirectionally via facsimile machines and wherein transaction records including facsimile signatures of the buyers and sellers are printed following completion of the transactions.

A further object of the invention is to provide a keyboard controlled, electronic funds transfer system for carrying out transactions between buyers and sellers, wherein identification modules provided to the buyers and sellers store transaction records, and wherein account information is accessed from the modules in response to a relatively small number of keystrokes.

To satisfy these and other objectives, an electronic funds transfer system for carrying out financial transactions between local or remote users, in accordance with one aspect of the invention, comprises at least one facsimile machine and portable identification modules, each module having an information storage means therein storing first data corresponding at least to a seller/buyer identification number, transaction amounts, transaction times, an account balance and a seller/buyer signature. The facsimile machine comprises, conventionally, first means including a document printer for printing data on a recording medium, input means including a keyboard for receiving second data manually entered thereon, and means for formatting the first and second data. The facsimile machine further includes means for transmitting formatted data including text and graphics via telephone lines or other communication medium to other facsimile machines. Provided in each facsimile machine are means for receiving formatted data incoming on the communication medium from the other facsimile machines and means for printing on the recording medium information including seller/buyer facsimile signatures corresponding to the formatted data.

In accordance with an important aspect of the invention, the system further includes an interface means incorporated with the facsimile machine for receiving the identification module. The interface means includes means for writing the second data to and reading the second data from the module. Processor means in circuit with the keyboard and the interface means, programmed to carry out seller/buyer transactions, includes means for coupling the first and second data to the formatting means and for updating the second data stored in the storage means in accordance with the transactions.

The storage means further includes means for storing account numbers and for storing corresponding account number abbreviation codes, and, in accordance with another aspect of the invention, the interface means includes means for reading out an account number in accordance with its abbreviation code keyboard entered by a buyer/seller.

The module preferably includes an integrated circuit therein including a non-volatile memory, such as an EEPROM, for storing the first data. The module may be in the form of a mechanical key, and in that example, the interface means includes a key receptacle for enabling a transaction mode of operation of the facsimile machine. Electrical contacts in the receptacle are positioned to electrically interconnect with corresponding contacts on the module.

In accordance with another important aspect of the invention, the interface means may comprise a pair of receptacles for receiving two of the modules, and a processor means is coupled to the receptacles and responsive to the keyboard for transferring the first and second data bidirectionally between the two modules. The processor means preferably further includes means responsive to the first and second data for controlling the printing means to print a transaction record comprising at least a transaction amount, transaction date and seller/buyer signatures.

In accordance with still a further aspect of the invention, the processor means is programmed to be operative selectively in (a) a local mode for transferring the first and second data between the two modules in the pair of receptacles within the facsimile machine, (b) a remote mode for transferring the first and second data between modules within receptacles of different facsimile machines and (c) an upload mode for transferring the first and second data from a module within a receptacle of the facsimile machine to a remote computer.

In accordance with a further aspect of the invention, in the remote mode of operation, the processor is programmed to carry out transactions at predetermined times, e.g., during times of the day having reduced telephone line charges or to complete the transaction on the next business day. Thus, the system additionally includes means for storing transaction data corresponding to a desired transaction and a desired time of transaction, a clock for indicating real time, comparison means for comparing real time and the desired transaction time and means responsive to the comparison means for carrying out the desired transaction at the desired time.

Furthermore, the interface means in accordance with still another aspect of the invention, additionally includes means for reading a requested transaction amount, keyboard entered by a buyer, and in response, authorizing the transaction only if the account balance stored in the storage means is larger than the requested transaction.

The processor preferably is further programmed to be operative in an interrogation mode wherein data stored in the storage means, corresponding to transactions previously completed, are printed by the document printer.

Still other objects and advantages of the present intervention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 9-1 to 9-6 are a flow chart showing programming for operating the processor of FIG. 8 to carry out transactions off-line, in a local mode, between a buyer and a seller.

FIGS. 10-1 to 10-10 are a flow chart showing programming for operating the processor of FIG. 8 to carry out transactions on-line, in a remote mode, between a buyer and a seller.

FIGS. 11-1 to 11-6 are a flow chart showing programming for operating the processor of FIG. 8 to carry out transaction clearing.

FIGS. 12-1 to 12-7 are a flow chart showing programming for operating the processor of FIG. 8 to provide communications between facsimile machines carrying out financial transactions therebetween in CCITT PROCEDURE T3.0 protocol.

BEST MODE FOR CARRYING OUT THE INVENTION

Financial transactions are carried out between a seller and buyer, in accordance with the invention, through transfer of electronic funds data between portable modules via a facsimile machine which hosts data transfer and prints transaction records for the parties. Each portable module may be in the form of a card or a mechanical key (hereinafter card/key) containing an integrated circuit including a non-volatile memory. A preferred embodiment of the system comprises a facsimile machine having standard features in addition to a special keyboard and a receptacle to receive an identification/data storage card/key of a seller, together with a transactor unit having a keyboard and a buyer identification/data storage card/key receptacle.

System Overview

Figure 1:
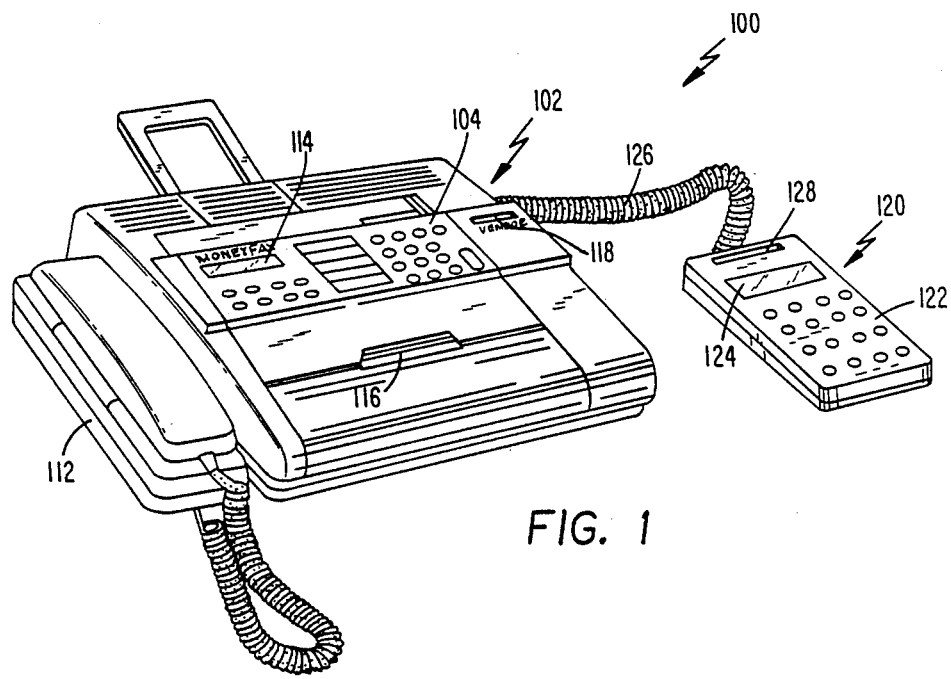
FIG. 1 is a perspective view of a transaction system in accordance with one embodiment of the invention, having a facsimile machine interconnected with buyer unit containing, respectively, receptacles for seller and buyer modules.

Referring to FIG. 1, a facsimile machine 102 has an operating panel 104 (see FIG. 7) including a keypad 106 having alpha-numeric keys, as well as system command keys 108 and function keys 110 to be described hereinafter. As is conventional, the facsimile machine 102 is connected in circuit with a telephone set 112, with both the facsimile and telephone adapted to be connected to standard telephone lines capable of carrying digital signals. The facsimile machine further includes a display 114 for displaying prompts and keyboard entries, and a paper receptacle 116 for storing paper upon which the facsimile machine will print transaction records produced locally or remotely via the telephone lines.

Thus far described, except for the particular functions controlled by keys 108 and 110, the facsimile machine 102 is conventional. However, in accordance with one aspect of the invention, the facsimile machine 102 is further provided with a seller card/key receptacle 118 which is adapted to receive a special identification card/key that is carried by a seller or alternatively is permanently retained in the receptacle to enable the seller to carry out transactions with local or remote buyers A buyer transactor unit 120 contains a keypad 122 and a display 124, interfaced with the facsimile machine 102 through a cable 126. The buyer unit 120 contains a receptacle 128 for receiving an identification card/key of the buyer, so that with buyer and seller identification cards/keys positioned within receptacle 128 of transactor unit 120 and receptacle 118 of the facsimile machine 102, financial transactions, once approved, can be carried out using financial and identification data stored in the two cards/keys. The data stored in the cards/keys thereafter are updated in accordance with the transactions, and transaction summaries are printed by the facsimile machine 102 to be provided to the parties.

Figure 2:
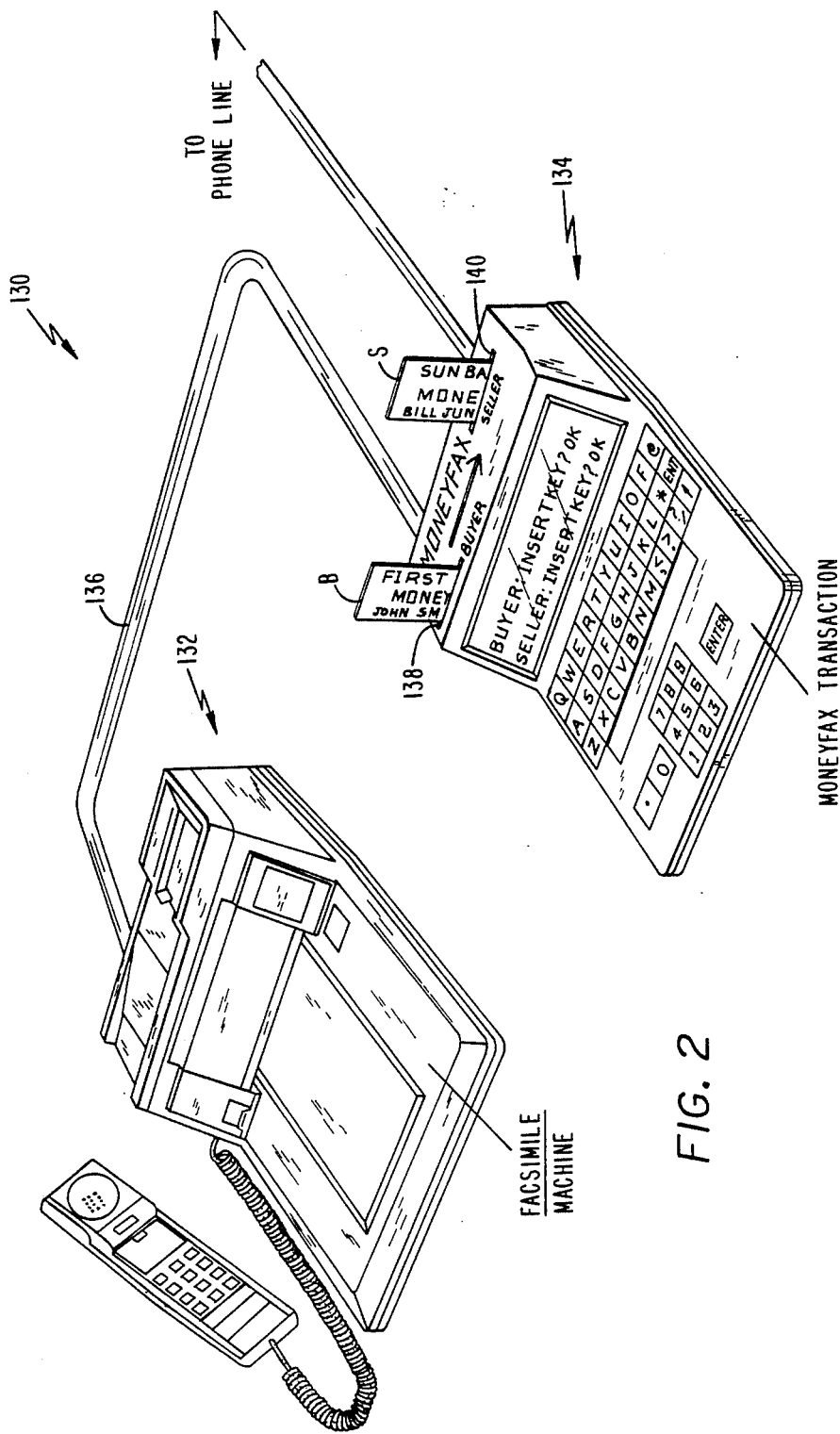
FIG. 2 is a perspective view of a transaction system in accordance with another embodiment of the invention, having a facsimile machine interconnected with a buyer/seller unit containing receptacles for both seller and buyer modules.

The embodiment shown in FIG. 1, with the buyer unit 120, electrically interconnected with, but physically separated from, facsimile machine 102, the buyer and seller are advantageously enabled to maintain some physical separation from each other and, accordingly, privacy On the other hand, embodiment 130 shown in FIG. 2 comprises a standard facsimile machine 132, having substantially no modifications provided thereto, that together with a buyer/seller transactor unit 134 of this convention is interconnected with the facsimile machine by a cable 136. Receptacles 138 and 140 within the buyer/seller unit 134 receive, respectively, buyer and seller identification cards/keys B and S.

Figure 3:
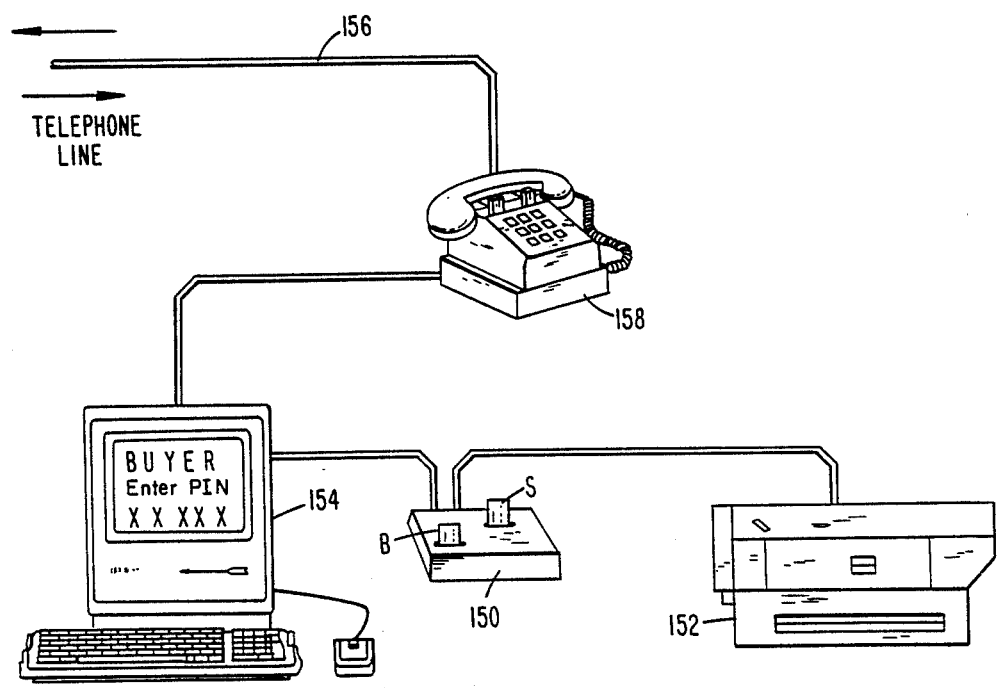
FIG. 3 is a view of a transaction system in accordance with a further embodiment of the invention, using a personal computer interfaced with a facsimile and buyer/seller transactor unit.

FIG. 3 shows another embodiment, in schematic form, wherein, a buyer/seller transaction unit 150 is interfaced with a facsimile printer 152 and a general purpose personal computer 154 that in turn is coupled to telephone lines 156 by a facsimile machine modem 158. The computer 154, printer 152 and modem 158 may, for example, be the components of a standard personal computer based facsimile system, such as the "APPLEFAX INC." system which is of a type that accepts transmission from conventional facsimile machines, in standard protocol, and communicates in a different protocol with other APPLEFAX machines The system switches from the standard protocol to a proprietary protocol after it has been determined that modem 158 is in communication with the modem of another APPLEFAX.

Because the embodiment of FIG. 1 is preferred, a detailed description shall hereinafter be made with respect to that embodiment.

Figure 8:
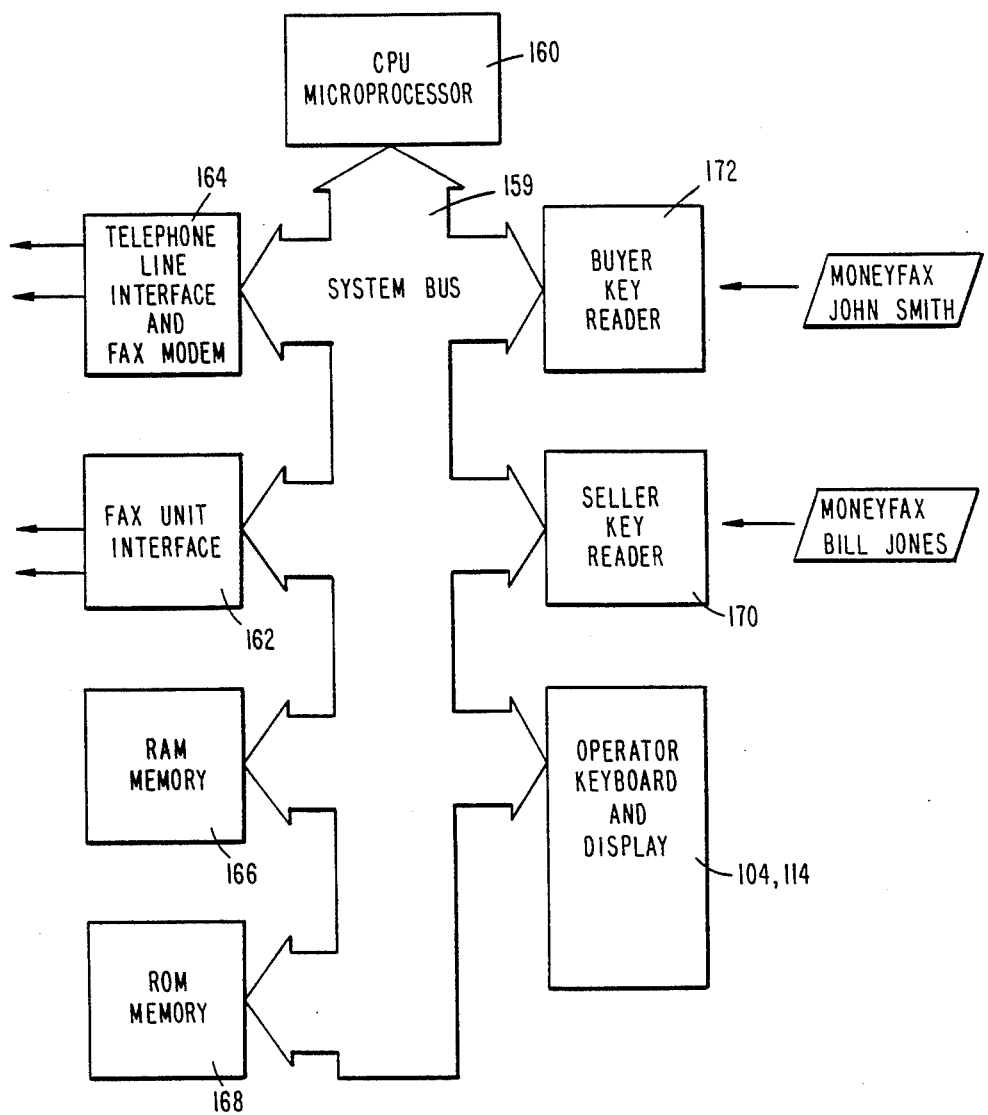
FIG. 8 is a system block diagram of the invention.

With reference now to FIG. 8, the facsimile machine 102 and buyer transactor unit 120 are connected in circuit with each other through a common bus architecture. Accordingly, connected on a common bus 159 are a microprocessor 160, incorporated within the facsimile machine 102, for controlling operation of the facsimile to carry out transactions in the manner to be described in detail hereinafter. Also within the facsimile machine 102 and connected to the bus 159 is a standard facsimile interface 162, similar to the one used in the APPLEFAX system, and a modem 164 (corresponding to modem 158 in FIG. 3) for interconnecting the bus with the telephone lines. Furthermore provided within facsimile 102 and connected to the bus 159 are a random access memory (RAM) 166 and a read only memory (ROM) 168 which provide, respectively, temporary storage of data from, and programming to, the microprocessor 160. Finally, also incorporated within the facsimile machine 102 and connected on the bus 159 are the operator keyboard and display 104, 114. A seller identification card reader 170 provided on the bus 159 has the card receptacle 118 shown in FIG. 1. The buyer identification card reader 172, shown in FIG. 8, is also connected on the bus 159 and is provided within buyer unit 120 of FIG. 1. The cooperation among the blocks shown in FIG. 8 shall be described in detail hereinafter.

The apparatus of the invention incorporates two identification cards (FIG. 4) or "keys" (FIG. 5), provided to the buyer and seller which function as vehicles for value exchange, with the value carried by each card/key being designated either as a credit or debit. To carry out a transaction, the buyer and seller position their card/keys B and S into corresponding receptacles in the facsimile machine 102 and buyer unit 120 (hereinafter for simplicity referred to respectively, as seller unit and buyer unit). The buyer and seller are prompted through the displays of the buyer and seller units to enter their personal identification numbers and transaction details, and if the transaction is authorized, i.e., the personal identification numbers are correct and the amount of the transaction is within the authorization limit of the buyer card/key, B value is exchanged between the two card/keys, debiting the buyer card/key and crediting the seller card/key S, and the facsimile machine prints records of the transaction for the buyer and the seller.

The system is operable in three modes, viz., a local mode, a remote mode and an upload or clearing mode. In the local mode, transactions are carried off-line between a buyer and seller at a common point of transaction and the facsimile prints transaction records for both the buyer and seller. In the remote mode, transactions are carried out through two facsimile machines between a buyer and seller at different sites and transaction records for the buyer and seller are printed by the two facsimile machines. In the transaction upload clearing mode, data accumulated from local and remote transactions are transferred to a central computer data base for clearing.

Figure 7:
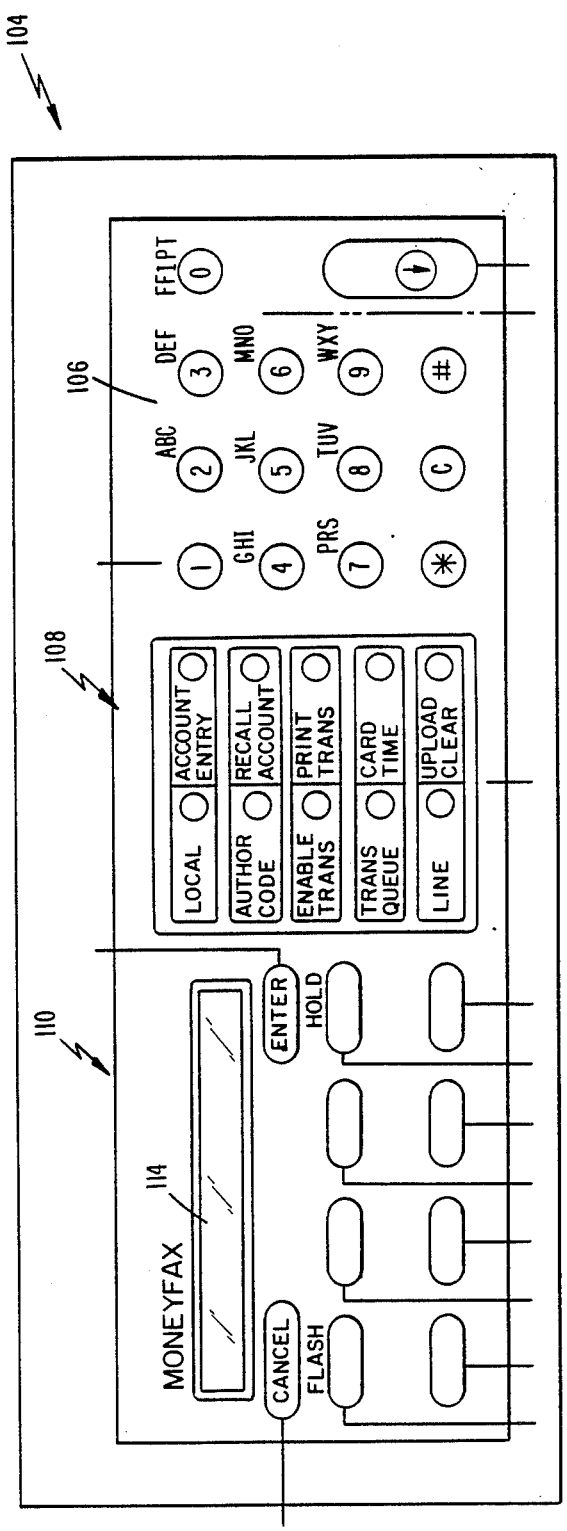
FIG. 7 is a view of the control panel of a facsimile used to carry out transactions in accordance with the invention.

More specifically, in the local mode, the seller unit 102 controls the transfer of financial transaction data between the seller card/key S inserted in seller receptacle 118 in unit 102 and a buyer card/key B inserted in receptacle 128 of buyer unit 120, at a common site. With reference to FIG. 7 showing a detail of the control panel of 104 of seller unit 102, when the LOCAL button in section 108 of the keyboard is depressed, the seller and buyer are prompted to insert their card/keys into receptacles 118 and 128. After the card/keys are correctly inserted, and the seller and buyer unit 102, 120 have established communications with the respective card/keys, and have confirmed that the card/keys are authentic, the buyer and seller are prompted at displays 114 and 124 to enter their personal identification numbers (PIN). The amount of the transaction is then keyboard entered by both the buyer and seller, and if the amount entered by each is the same and is not greater than the credit/debit balance stored in the buyer card/key, the buyer card/key is debited, and the seller card/key credited, by the amount of the transaction.

The seller unit 102 prints "mirrored" transaction records to the buyer and seller, including the buyer and seller account numbers, transaction date, time, amount and buyer/seller identification. In addition, facsimile signatures of the buyer and seller are printed to establish a facsimile representation sales contract.

The buyer/seller account numbers and identification data are read from data stored in the buyer and seller modules whereas the time and date data are generated by a real time clock provided in the seller unit 102. Following the transaction, the buyer and seller are prompted to remove their card/keys, and to take one of the two copies of the transaction record. After removal of the card/keys, the seller unit 102 reverts back to its standby condition to be used either as a transaction unit or standard facsimile machine.

In the remote mode, a transaction is carried out via the telephone lines between a buyer at one location, with his card in receptacle 128 of a local buyer unit 120, and a seller at a remote location, with his card in receptacle 118 of a remote seller unit 102. When the necessary transaction data have been entered at keyboards 122 and 104 of the buyer and seller units 102, 120, at two different sites, and with the buyer and seller card/keys B, S inserted in their respective receptacles, a request for transaction can be carried out immediately, or at a later time based upon prior mutual agreement between the parties. The following scenario is an example of how the system may be used to carry out a transaction between remote parties.

Assume that a seller and buyer agree, during a voice conversation by telephone, to a certain purchase price for some goods and services, e.g., $100. Both parties mutually concur on this amount and further agree that the transaction should occur at 12:05 A.M. so that the transaction event is dated the following day. The seller gives the buyer an account number and an authorization number, and the buyer reciprocates by giving the seller the buyer's account number. If the parties are using the telephone handset 112 joined to the seller unit 102 (FIG. 1), they can enter the respective account numbers, authorization code and the phone number of the seller immediately. Both parties complete the call and hang up.

Optionally, to avoid the necessity to keyboard enter lengthy account numbers, the parties may use an ACCOUNT ENTRY key, provided in section 108 of the keyboard (FIG. 7), which when depressed, prompts the user for an account number and then an authorization code. This code is automatically generated by implementing an algorithm that combines the seller and buyer account numbers, the transaction amount, the date, and the serial number of the facsimile machine modem, and is always unique. The ACCOUNT CODE key, when depressed, takes the currently selected account number from a memory queue and prompts for the amount. If this key is activated when the ACCOUNT ENTRY function is being used, the account code thus generated is automatically stored in the queue along with the unique buyer account number. At any time, the user may display and print out an itemized list of the account numbers contained in the queue and last entered amount, if available, associated with each account number. A simple two digit code may be linked to each account number for easy recall. To continue with the example, the seller, before leaving the office at e.g., 5:00 P.M. activates the seller unit 102 into its transaction mode by inserting his card/key S into receptacle 118. Depending upon which receptacle, i.e., seller receptacle 118 or buyer receptacle 128, receives a card first, the unit 102 determines which procedures to execute. Immediately, the buyer is prompted at display 114 to enter his personal identification number, followed by his account number and an authorization code. If the account number and authorization code are already in the queue, the RECALL ACCOUNT NUMBER key, in keyboard section 108, may be depressed. Activation of this key prompts for entry of the two digit account queue number, followed by operation by the vendor of the ENTER key. The display 114 next displays the current time and date and prompts the seller for entry of an optional time and date after which the desired transaction is assumed to have clearance to proceed.

Having selected the buyer account number, authorization code and transaction date and time, the seller depresses the ENABLE TRANSACTION key. The approved transaction is queued and then internally assigned a transaction identification number. The required transaction will then be carried out, automatically, at the desired time Meanwhile, the buyer at a remote location enters his card/key B into receptacle 128. The buyer is prompted to enter his personal identification number. Assuming that sufficient funds are available from the buyer card/key B, the buyer is prompted to enter the seller's account number, together with the authorization code and transaction amount, previously communicated between the parties by the telephone. Alternatively, the buyer may depress the RECALL ACCOUNT key to enable the facsimile machine to respond to the two digit code representative of the seller's account number position within the queue. The buyer recalls the seller's account number, authorization code and transaction amount as previously entered, and depresses the ENTER key. The buyer is then prompted for a time and date after which the transaction is permitted to proceed; otherwise, the transaction is permitted to proceed immediately.

The buyer then depresses the ENABLE TRANSACTION key, and the transaction number is automatically assigned to the one just entered. This enables the entry of multiple transactions, useful for making multiple payments to different vendors, automatically, over a preset time span. Similarly, operation of the TRANSACTION QUEUE key will display and print a list of all current transactions with their associated accounts, amounts, dates, times and status. The buyer leaves his card/keys in the receptacle 128, and departs the office.

At the designated time on the following morning, the unit 102 at the site of the buyer automatically calls the unit 102 at the site of the seller which automatically answers The buyer unit identifies itself to the seller unit as a facsimile machine operating in the transaction mode, to differentiate from conventional facsimile operation, and the two machines communicate with each other using a common protocol. The buyer unit at the buyer's site interrogates the buyer card/key in receptacle 128, and reads from the memory of card into its own memory the buyer account number, credit/debit balance, name, address and telephone number of the buyer and the buyer's facsimile signature.

At the same time, the unit at the seller's site reads the same set of information from the seller card/key S in receptacle 118, and a packet of information containing the seller/buyer account number, transaction amount, date and time, seller/buyer address and telephone number and facsimile signature is alternately transferred between stations via the telephone lines. This information is transferred in a conventional facsimile information field of the HDLC (high level data link control) facsimile data frame, consisting of a number of subframes, each further subdivided into several fields.

Immediately after these data have been exchange between units at site of the buyer and seller, each verifies that the account number, authorization code and amount are those previously authorized and entered into the transaction queue. The buyer unit verifies that the seller account, amount and authorization code are those that are stored in its queue and similarly, the seller unit verifies that the buyer account, authorization number, amount and time and date are valid for the transaction to proceed. The two units then reciprocally transmit to each other an "approval to store" command, upon receiving approval, each facsimile machine writes the data into the buyer/seller card/key residing in its receptacle.

Figure 4:
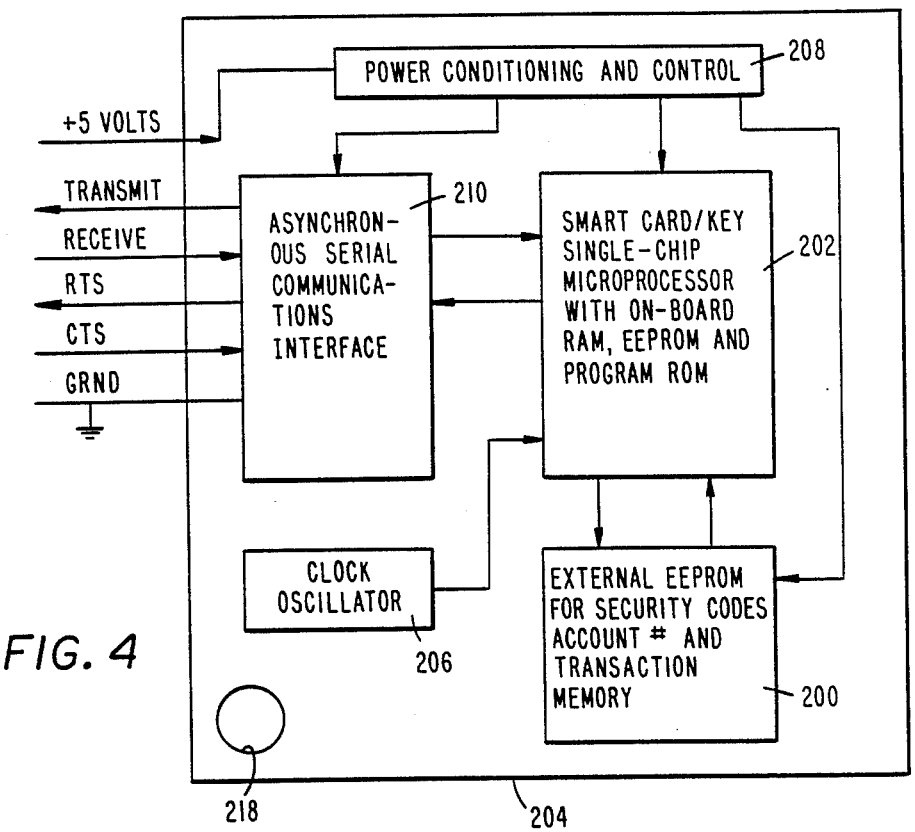
FIG. 4 is a diagram of a portable identification module in the form of a card containing an integrated circuit in accordance with one embodiment of the invention.

Each card/key, whether in the form of a credit card as shown in FIG. 4, or a mechanical key (FIG. 5), contains a microprocessor and non-volatile memory integrated circuit. The microprocessor verifies that the transaction has been correctly stored in the nonvolatile memory, and communicates this status to the corresponding transactor unit. When each unit receives the "transaction data stored and valid" response from its inserted card/key, the unit transmits a status response to the remote unit to certify that the data have been successfully stored into the card/key. When each unit receives the "transaction stored" status message, a local command is issued by the unit to its inserted card to make the transaction record "permanent" and hence "close" the transaction event.

If all aspects of the operation proceed affirmatively, then the card/keys of the buyer and seller will contain duplicate images (mirrored images) of the transaction data in their non-volatile memories. At the close of the transaction, the two transactor units print a formatted document containing a transaction summary including buyer and seller facsimile signatures and, optionally, a facsimile watermark of the sponsoring institution.

In the transaction upload or clearing mode of operation, data accumulated by each buyer/seller card must be transferred to a central computer data base for clearing and reconciliation with the corresponding transactions stored in the cards of the other buyers/sellers, including accrual of interest and fees. To transport these data to a central computer, the contents of each card are read, the central computer is called and the data read from the card are transferred and the card memory thereafter is reset. This mode also enables the credit/debit balance in the card to be upgraded or reduced at the request of the cardholder or issuing financial institution. A typical upload clearing procedure takes place as follows.

The UPLOAD/CLEAR key in keyboard section 108 is depressed, and in response, the cardholder is prompted to insert his card/key into seller receptacle 118 or buyer receptacle 128. When the card/key has been properly inserted, and the personal identification number successfully keyboard entered, the telephone number of the central computer is requested if it is not already loaded in the memory of the modem of the unit 102. The unit 102 dials the central computer installation, and following establishment of communication, the modem transmits a frame of information identifying itself and the account number of the cardholder. Transactions are sequentially read from the card/key and transmitted, along with frame labelling, error checking and confirmation, to the central computer. When all transactions have been transmitted, the central computer acknowledges to enable the memory of the card-/key to be reset. The card/key confirms to the modem of the unit 102 that its transaction memory has been successfully cleared, and the confirmation is received and retransmitted to the central computer which flags the transferred data set is complete and valid and logs the ending balance contained in the card/key In addition, as another attribute, the cardholder may at any time interrogate the balance stored in his card-/key by depressing the TRANSACTION DATA key in keyboard section 108. When the card/key is inserted into either the seller or buyer receptacle 118, 128, and the personal identification number of the buyer or seller correctly keyboard entered, the cardholder is prompted to select a review of either the balance or a complete printout of all accountant transaction data in the card-/key memory. If only the "balance" option is selected, the current account balance is displayed at display 114 and printed out by the facsimile printer. If the "full data review" option is selected, all information stored in the card/key is printed along with a sequential and chronological list of credit and debit transactions.

With reference to FIG. 4, each buyer/seller card/key B, S may be in the form of a credit card sized module containing integrated circuitry for storing and processing buyer/seller identification and transaction record data. These data are stored in a non-volatile memory, such as EEPROM 200, incorporated together with a microprocessor 202 within the body of the card 204/key. The operation of the microprocessor 202 is synchronized by a clock oscillator 206, and is powered, through conditioning circuitry 208, by a voltage supply in the facsimile modem. Communication between the microprocessor 202 and the modem is carried out through an asynchronous serial communications interface 210. All components within the card 204/key, being conventional, are not described in detail.

Figure 5:
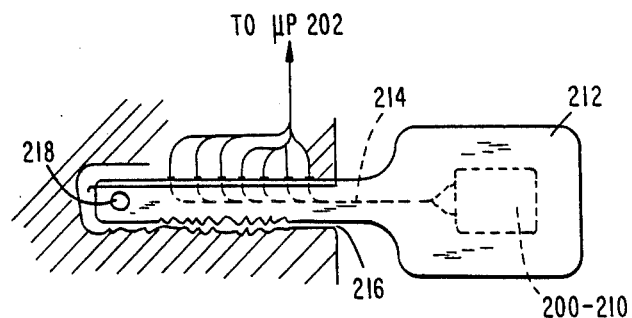
FIG. 5 is a diagram of a portable identification module in the form of a mechanical key containing an integrated circuit in accordance with another embodiment of the invention.

Referring to FIG. 5, the buyer/seller card/key B, S may alternatively be in the form of a mechanical key 212 which locks/unlocks the transaction unit/facsimile 102, in a conventional manner. However, additionally, the key 212 contains integrated circuitry 200–210, corresponding to the integrated circuitry of FIG. 4, coupled through printed circuit traces 214 to corresponding traces in a key receptacle 216 in the facsimile machine 102. Further details of the key 212 are given in copending application Ser. No. 07/236,612 filed concurrently herewith, and incorporated herein by reference. Accordingly, the key 212 both mechanically locks and unlocks the machine and carries transaction data in the manner described herein.

The system is secure from misuse since it enables transactions only in response to keyboard entry of the correct personal identification number of each of the buyer and seller, together with the previously agreed transaction information. As a further level of security, however, key 212 in FIG. 5 as well as card 204 in FIG. 4 is preferably provided with an aperture 218 for receiving a retaining member 205 which may be in the form of a solenoid actuated rod 207, shown in FIG. 6, within the transactor unit receptacle 118, 128, to retain the key or card there within unless a predetermined release code is keyboard entered. This enables the buyer and seller to defer the transaction until a later time, without concern that the key or card would be removed by an unauthorized user. Other means of retaining the key or card within the receptacle, such as a receptacle cover, could be employed as well.

Operation Sequence Programming (1) Off line mode

Figure 6:
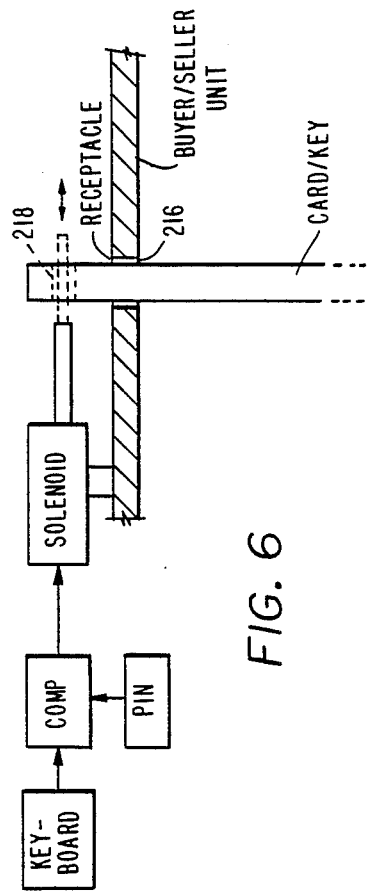
FIG. 6. shows a mechanism for retaining the module of FIG. 4 or 5 into the facsimile machine until the module is released in response to a keyboard entered user code.
Figures 1, 9:
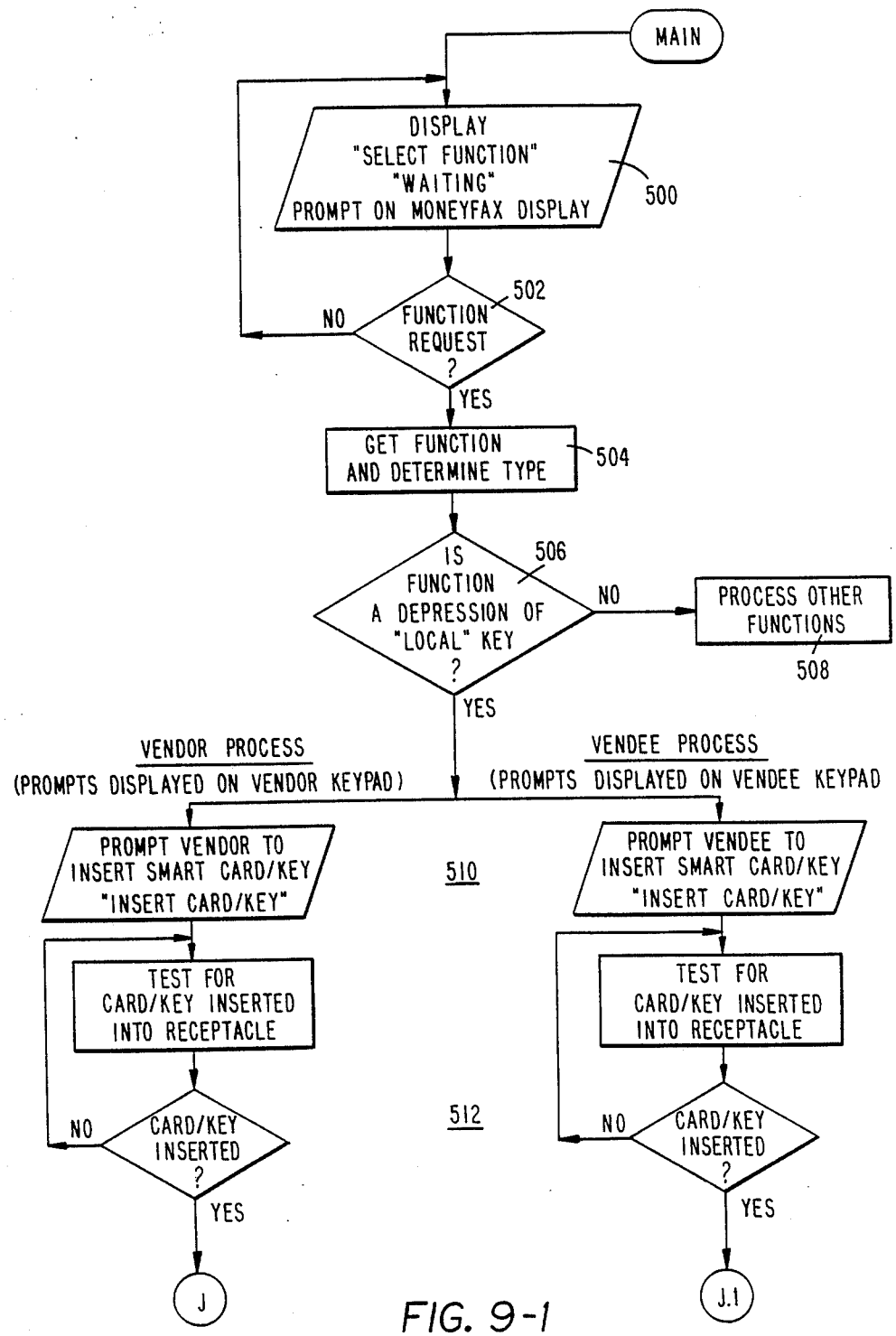
Figures 2, 9:
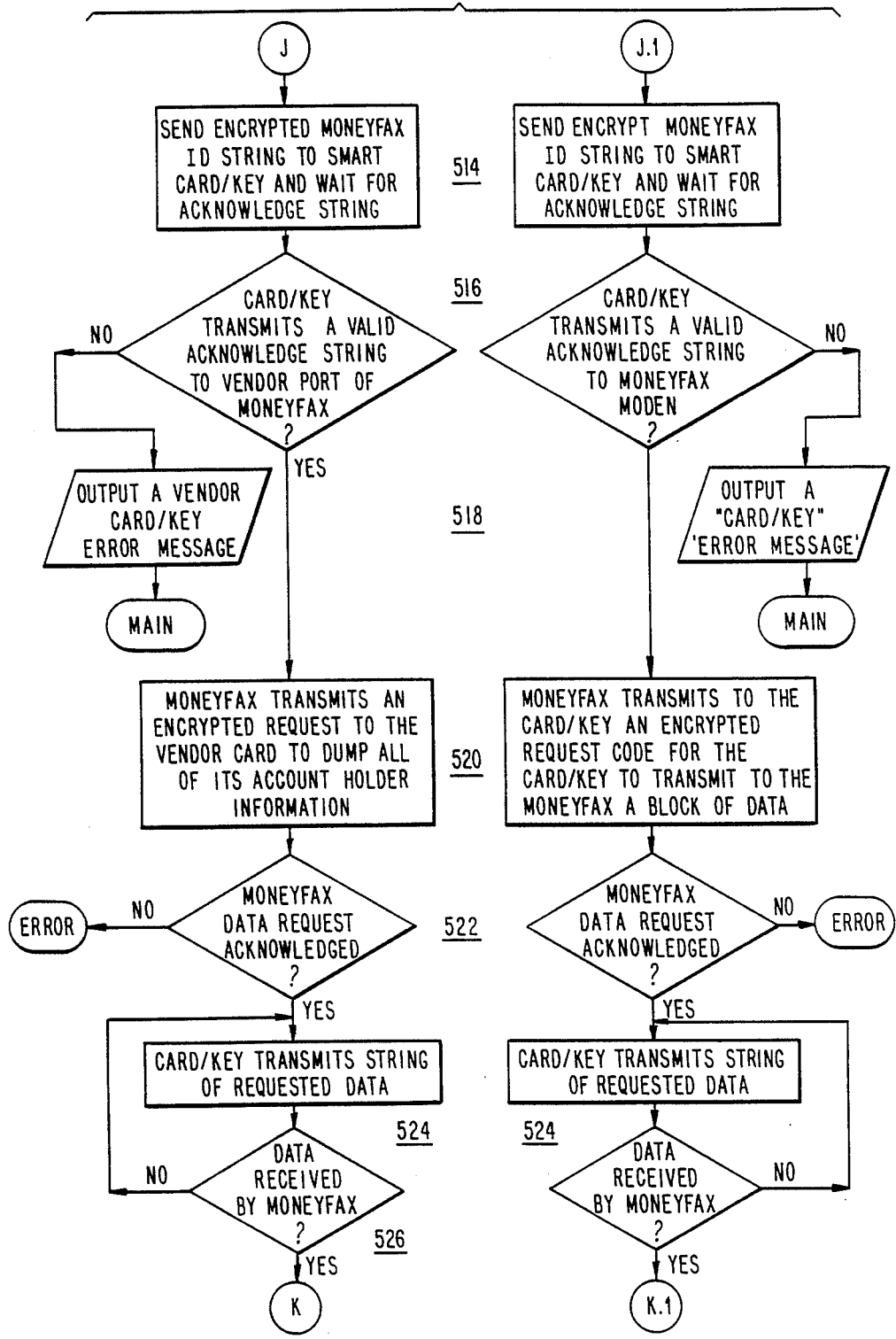
Figures 3, 9:
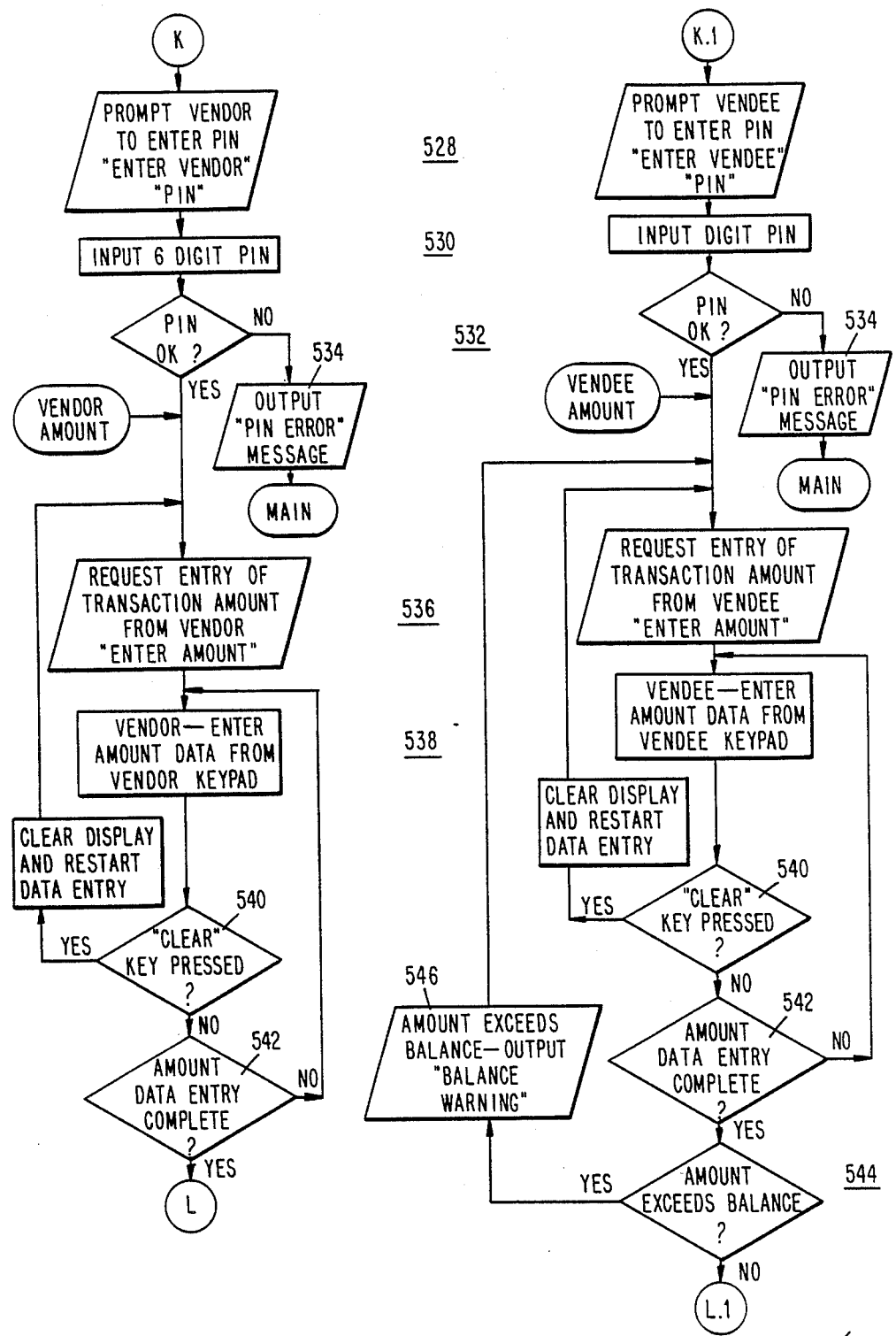
Figures 4, 9:
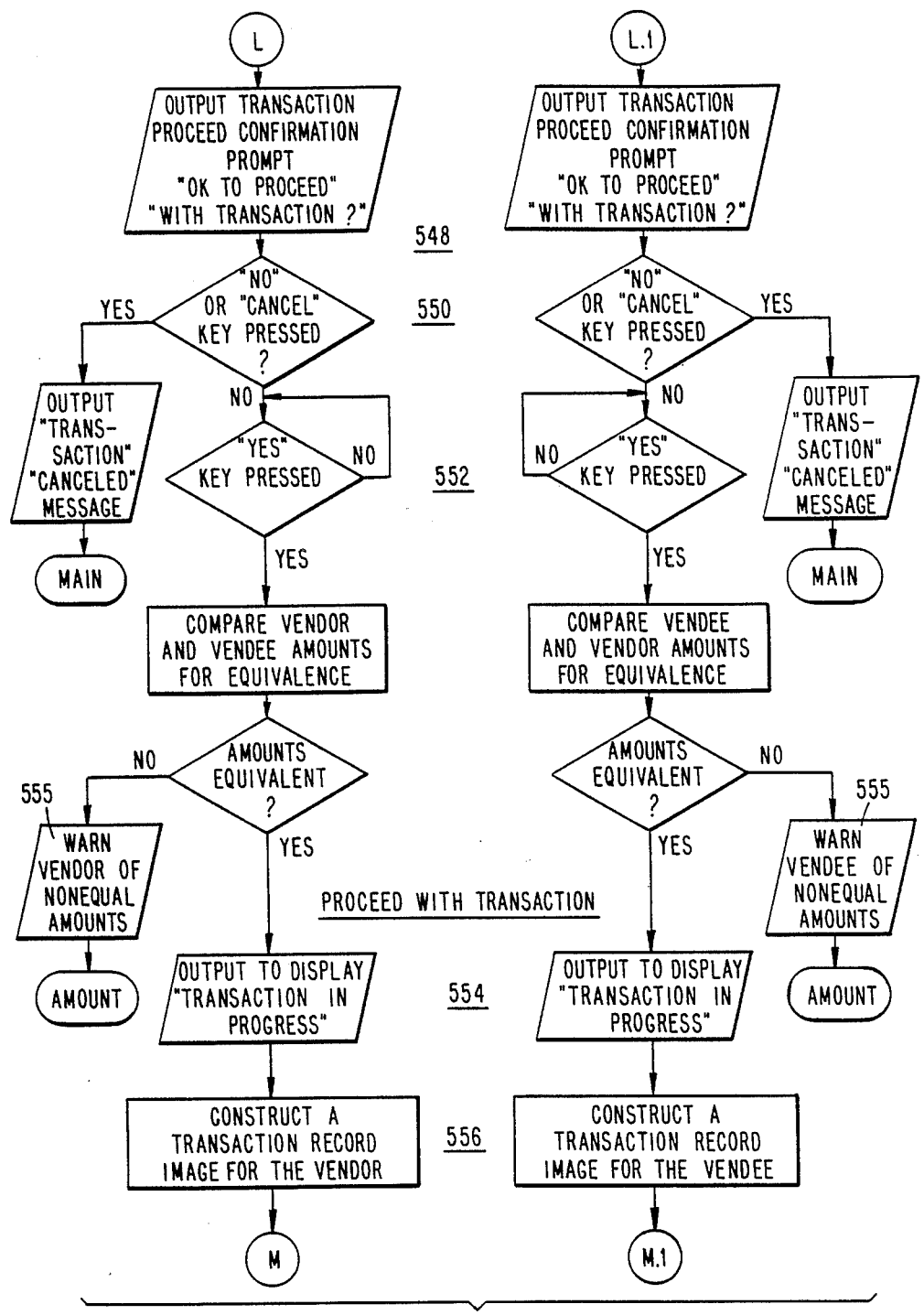
Figures 5A, 9:
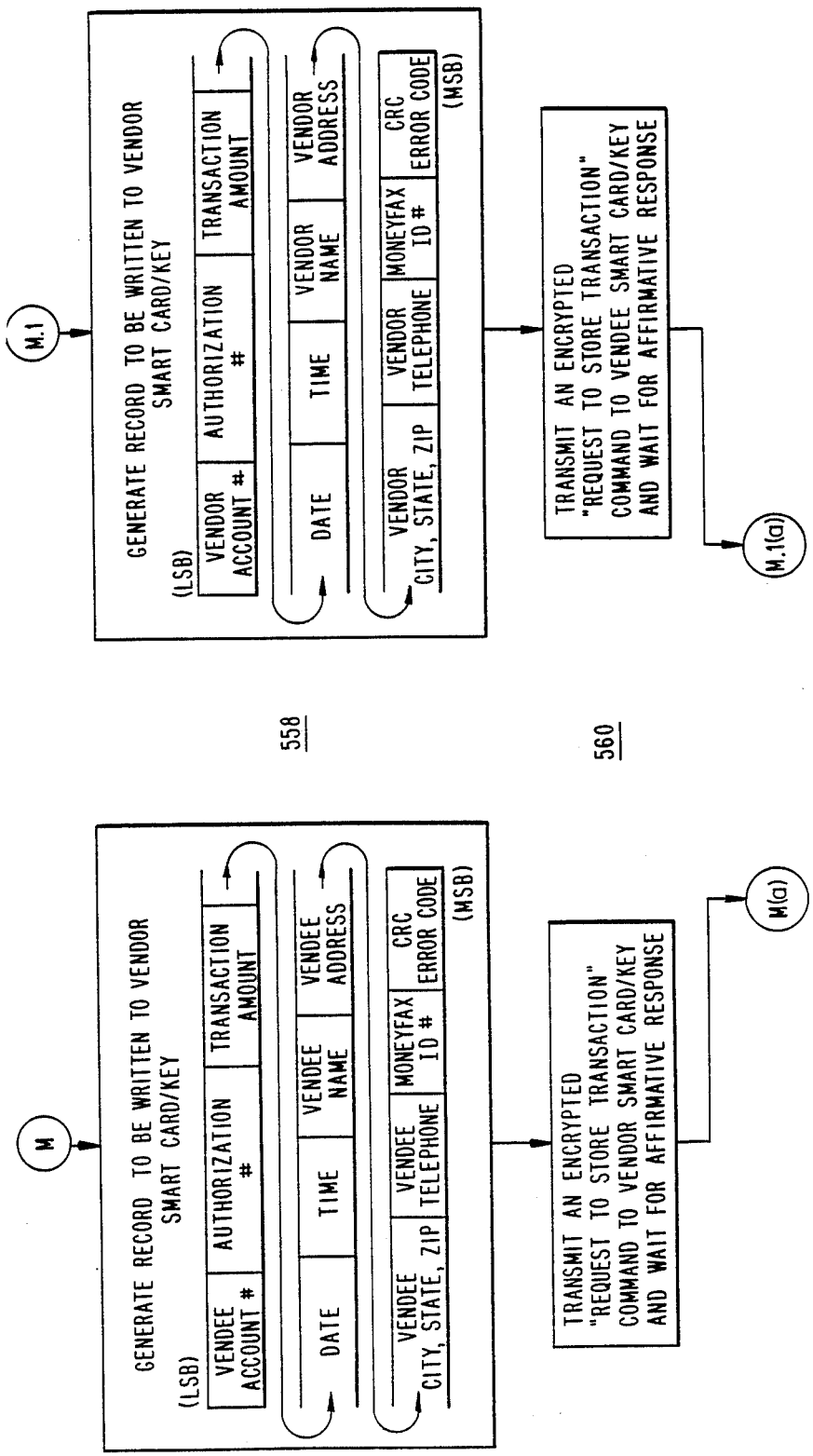
Figures 5B, 9:
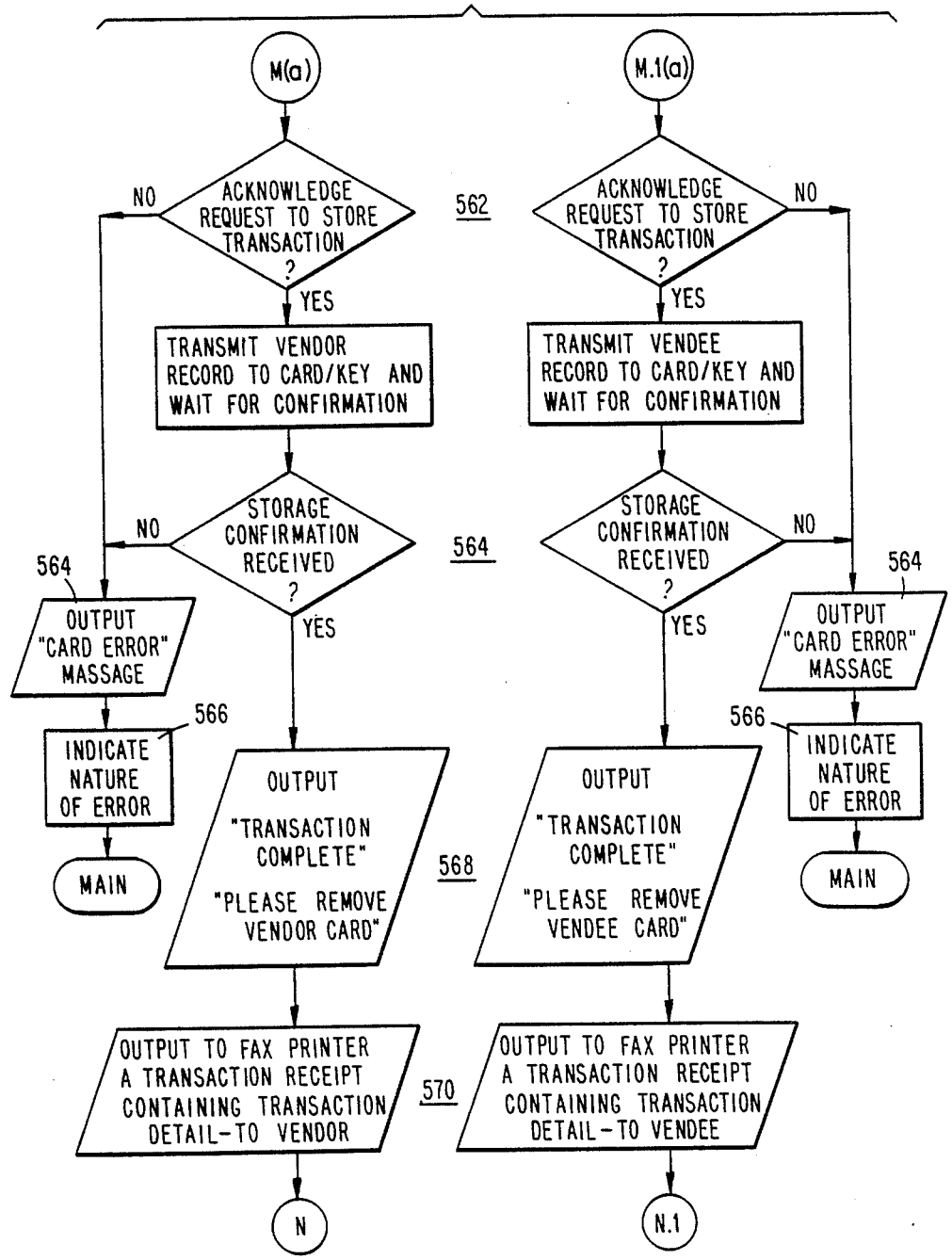
Figures 6, 9:
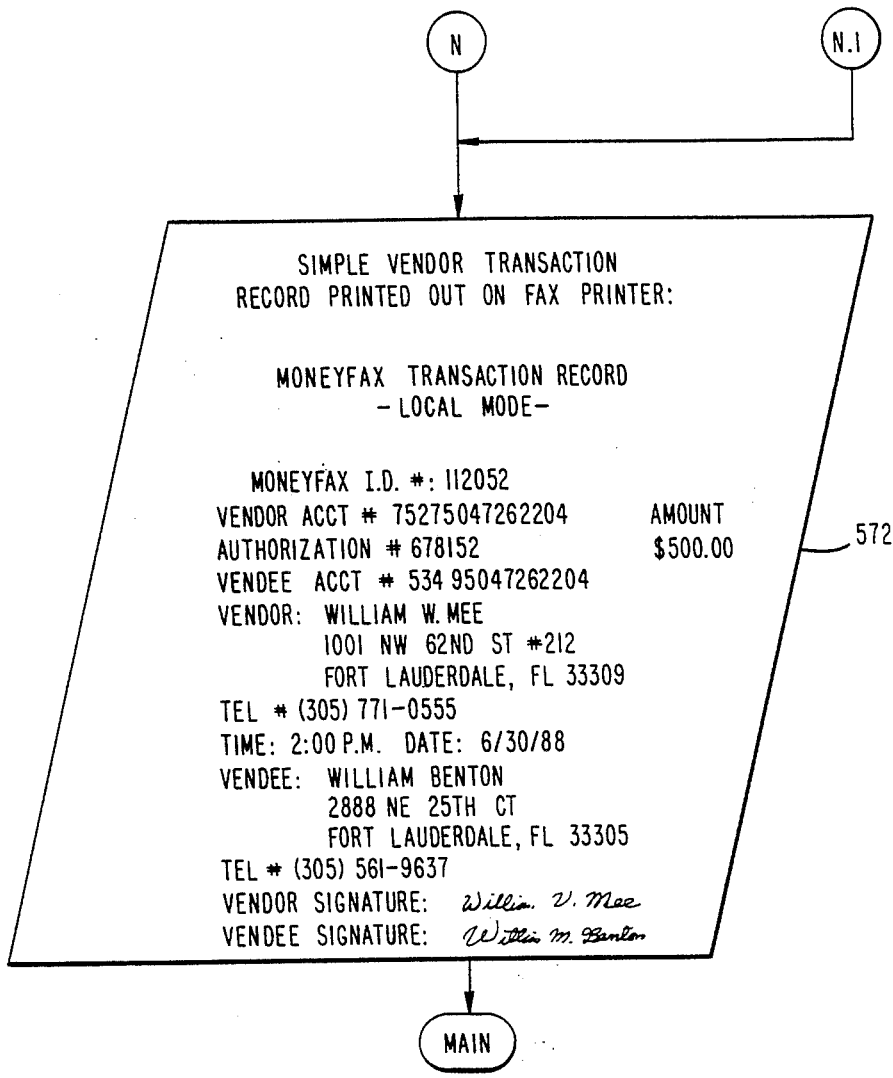

Referring now to FIGS. 9-1 to 9-6 in the off-line mode, the modem of facsimile (seller unit) 102 initially is in an idling, or standby, state, as provided at step 500, waiting for an incoming telephone call, the depression of a function key, a scheduled transaction event or the insertion of a buyer or seller card/key into its receptacle (step 502). The type of function to which the facsimile machine 102 is to respond is determined in step 504, e.g., whether the function requested is defined by the depression of the LOCAL key of keyboard section 108 (step 506). If not, other functions are processed at step 508, and if so, buyer (vendee) and seller (vendor) functions are independently carried out by seller unit 102 and buyer unit 120 under control by microprocessor circuitry in each. Accordingly, the seller sequence is shown in the left hand portion of the flow chart and the buyer sequence is shown on the right.

In step 510, the buyer and seller are prompted on the respective displays 114, 124 to insert the seller and buyer cards/keys S, B in receptacles 118 and 128. Each unit 102, 120 tests the card/key in its receptacle (step 512) to determine that a card/key is present, and if so, an encrypted identification string is transmitted to the card/key to await an acknowledgement string (step 514). Communication between the card/keys and the units 102, 120 take place through interface 210 of the card/key 204/212 shown in FIGS. 4 and 5. In step 516, the card/key transmits a valid acknowledgement string to the buyer and seller units 102, 120; otherwise, an error message in step 518 is generated. The modem of unit 102 next generates an encrypted request to the seller and buyer cards/keys to dump al of this data in the form of an encrypted string containing the personal identification number, account number, account balance, name, address, city, street, zip code, phone number and enciphered signature of the cardholder (buyer/seller). In response, the unit 102 generates an acknowledgement signal or an error signal (step 522).

The seller and buyer card/keys next transmit a string of the data described above to the unit 102. These data are stored in a continuous block of memory allocated to the seller and buyer accounts, respectively (step 524), and are acknowledged by the unit 102 in step 526. The card/key data from the seller and buyer are now resident in the memory of the unit 102.

The seller and buyer are prompted to enter their personal identification numbers (step 528), and each is permitted three attempts to correctly keyboard enter the PIN (step 530). If the PIN is not correctly entered by the seller or buyer within three attempts (step 532), an error message (step 534) is displayed; otherwise, the seller and buyer are both prompted to keyboard enter the amount of the transaction (step 536).

The seller and buyer now keyboard enter both the amount of the transaction, to which the parties have previously agreed (step 538). Meanwhile, if the "CLEAR" key is depressed by the seller or buyer (step 540), the respective display is cleared.

After keyboard entries of the transaction amount in the seller and buyer units are complete, detected by operation of the ENTER key of the seller and buyer units in step 542 (see keyboard section 110 of FIG. 7), the buyer unit 120 determines whether the transaction amount, keyboard entered by the buyer, exceeds the amount remaining in the buyer card/key (step 544). If so, a "BALANCE WARNING" message is displayed (step 546) by the buyer unit, and the buyer is prompted to reenter the transaction amount. Otherwise, the message "OK TO PROCEED WITH TRANSACTION?" is displayed by each unit (step 548).

The seller and buyer may cancel the transaction (step 550) or proceed (step 552). If the "YES" key is depressed at each unit, the seller and buyer are deemed to have agreed to carry out the transaction, and if the amount keyboard entered by the seller and buyer are identical, the transaction is carried out (step 554); otherwise, a "NONEQUAL AMOUNTS" message is displayed at each unit (step 555).

To carry out the transaction in progress, the unit 102 constructs a transaction record image in its random access memory 166 (FIG. 8), applied to the memory of processor circuit 202 (FIG. 4) in the seller and buyer cards/keys S, B, for archival storage (step 556).

The format of the record written into the seller and buyer cards/keys is shown in step 558 of the flow chart; the date and time are provided by a real time clock within the facsimile machine 102, and the authorization number is developed by the facsimile machine, transparent to the seller and buyer.

The unit 102 transmits an encrypted "REQUEST TO STORE TRANSACTION" command to the seller and buyer cards/keys (step 560) and awaits an affirmative response. If no acknowledgement is received by the unit 102 (step 562), a "CARD ERROR" message is displayed by each unit (step 564), and diagnostics software indicates the source of failure (step 566). If the storage confirmation is received by the unit 102, on the other hand (step 564), each unit 102, 120 displays a "TRANSACTION COMPLETE" message, and the buyer and the seller are prompted to remove their cards/keys (step 568).

The data stored in step 558 are now transferred to the facsimile printer, to print "mirrored" transaction records to the seller and buyer (step 570). The transaction record contains the identification number of the facsimile machine (seller unit) at which the transaction has been carried out, i.e., the identification number of its modem, seller and buyer account numbers and the transaction authorization number. Also printed are the amount of the transaction and identification of the seller and buyer. Of particular importance, additionally printed are facsimile signatures of the seller and buyer, read from the read only memories of the seller and buyer identification cards/keys, shown at the bottom of block 572, and forming a facsimile sales contract.

(2) Remote Transaction Sequence

Referring now to the flow chart of FIGS. 10-1 to 10-10, a transaction is carried out between a seller and buyer at remote locations as follows. The seller and buyer units 102 and 120 initially display a "SELECT FUNCTION WAITING" prompt, in step 600; any function key, when depressed, is identified and the function is executed (step 602). If the function detected is the insertion of a seller card/key, (step 604), a preliminary test is carried out to determine whether the card/key inserted in receptacle 118 is a valid one (step 606); if not, an error message is displayed in step 608. Assuming that the card/key is determined to be valid, the personal identification number and seller account number and identification data are read from the card/key (step 608). This process is carried out by the microprocessor circuitry 202 within the card/key which transmits an identification string to the modem of facsimile machine 102; the string is formatted as follows:

PIN, ACCOUNT NUMBER, SUBACCOUNT NUMBER, NAME, ADDRESS, CITY, STATE, ZIP CODE.

The string of data is stored in a specifically allocated location of memory in the modem of unit 102 (step 610), and the seller is prompted to enter his personal identification number (step 612).

If the seller fails to enter the correct personal identification number, i.e., the one which corresponds to the stored personal identification number (step 614), and he does not succeed within three attempts, an error message is displayed (step 616). Otherwise, if there is a match (step 618), the seller is prompted to keyboard enter the account number of the buyer (step 620) which the seller has previously obtained However, optionally, the account number together with an authorization code and amount can be recalled from a data queue if these data were previously entered by the seller, e.g., if the current transaction is the same as a previous one or if the data have otherwise been stored. If so, the "RECALL ACCOUNT" key is operated (step 622) and the program branches to the subroutine shown in FIG. 10-5 wherein at step 624, the two digit account queue number is keyboard entered in response to a display prompt. Following entry of the queue number (step 626), the transaction data are displayed (step 628), i.e., the queue number together with the account number, authorization code and amount, are displayed as shown in block 628. If during step 626 the "PRINT QUEUE" key is depressed, the facsimile printer is controlled to print out the queue of account numbers, authorization codes and transaction amounts (step 630). In each case, program execution returns to the main program.

Figures 1, 10:
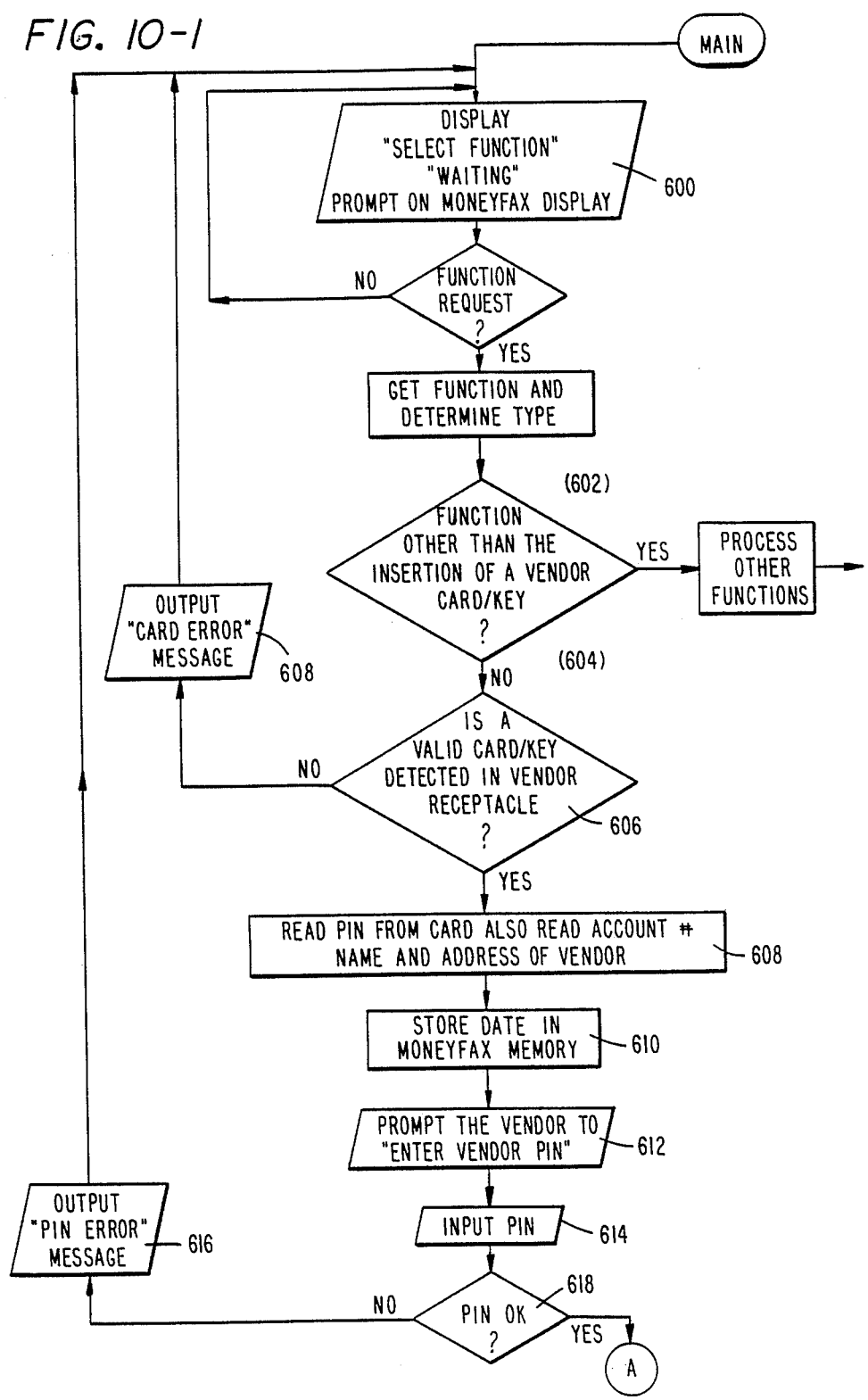
Figures 2, 10:
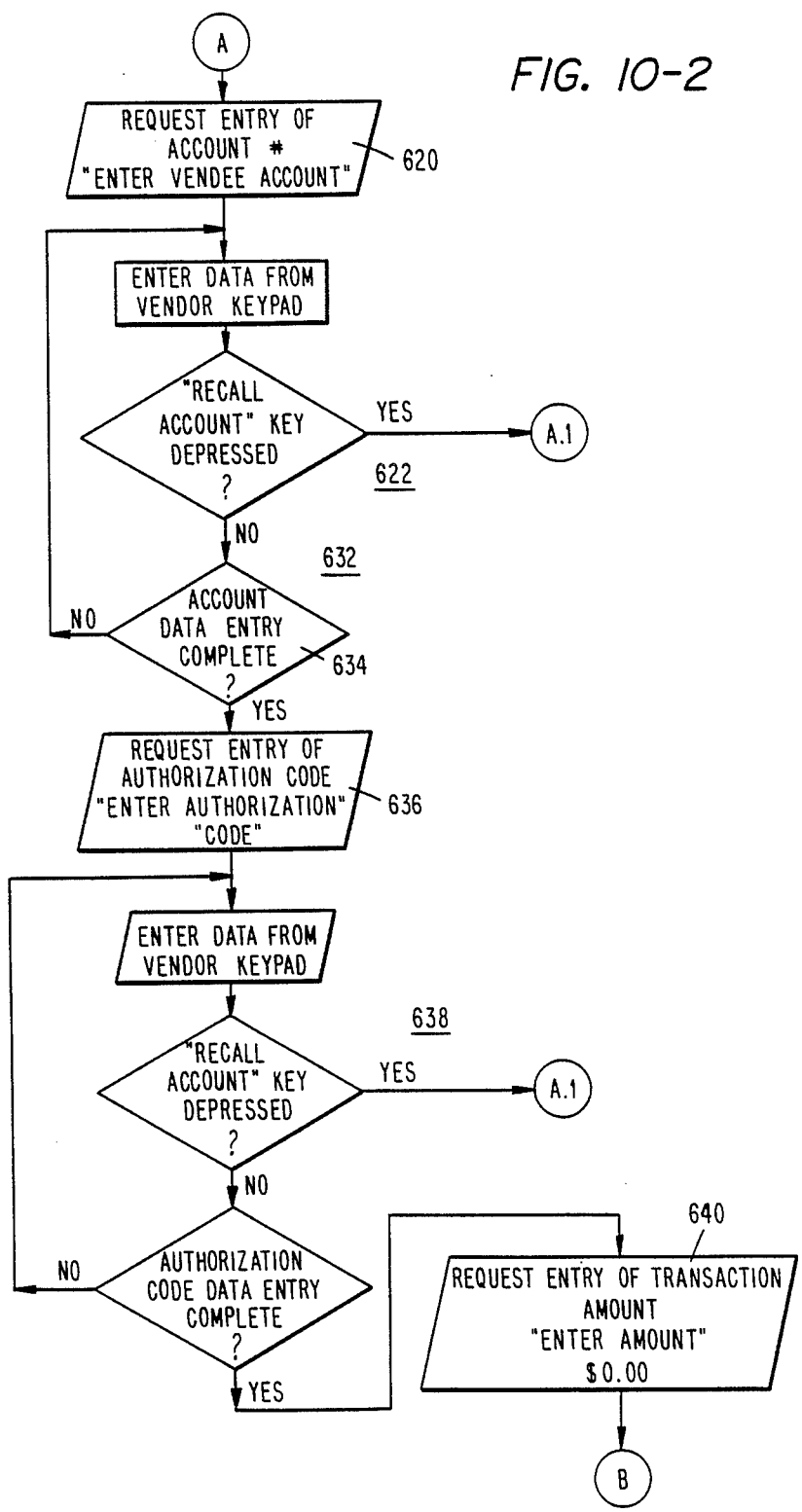
Figures 3, 10:
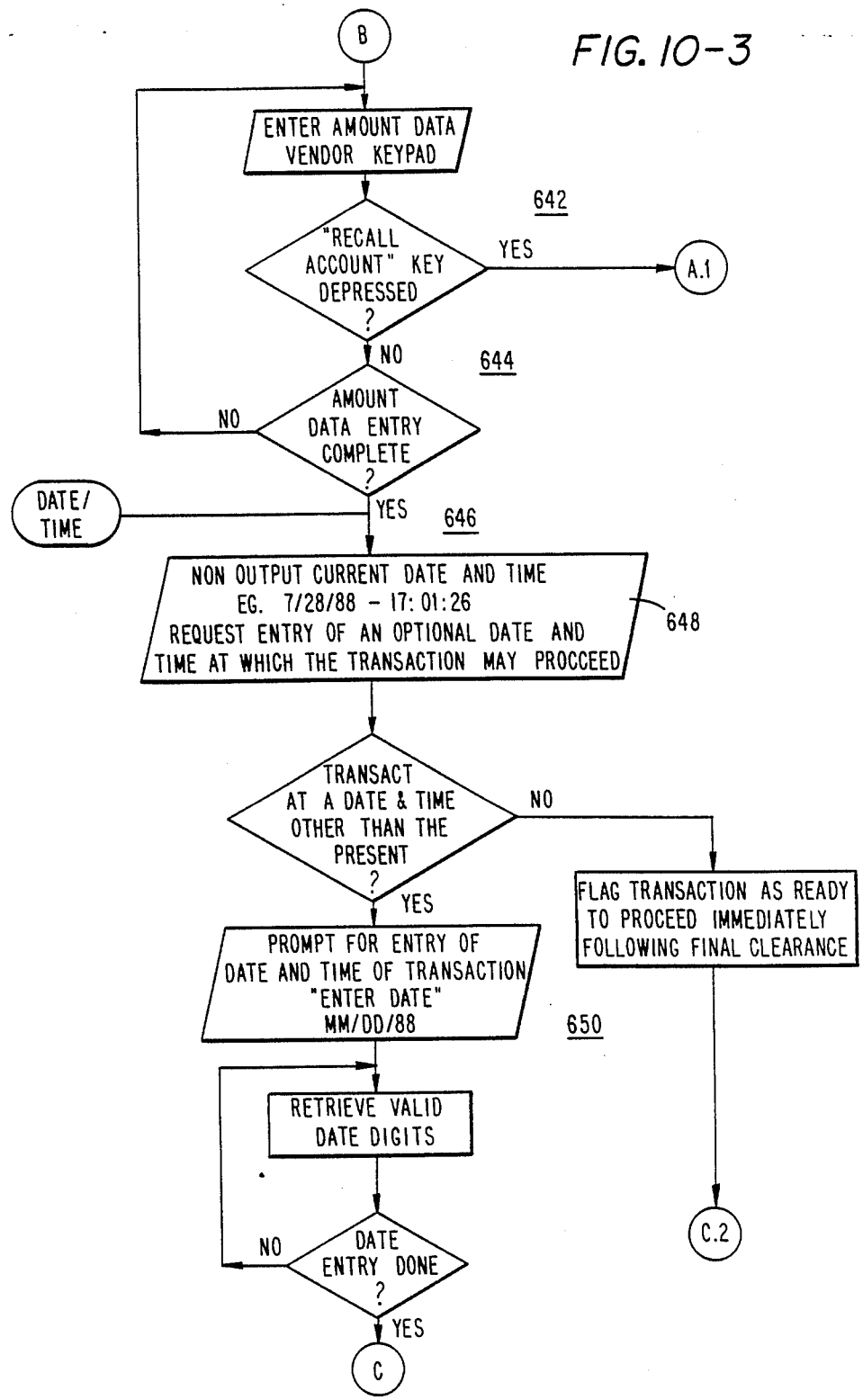
Figures 4, 10:
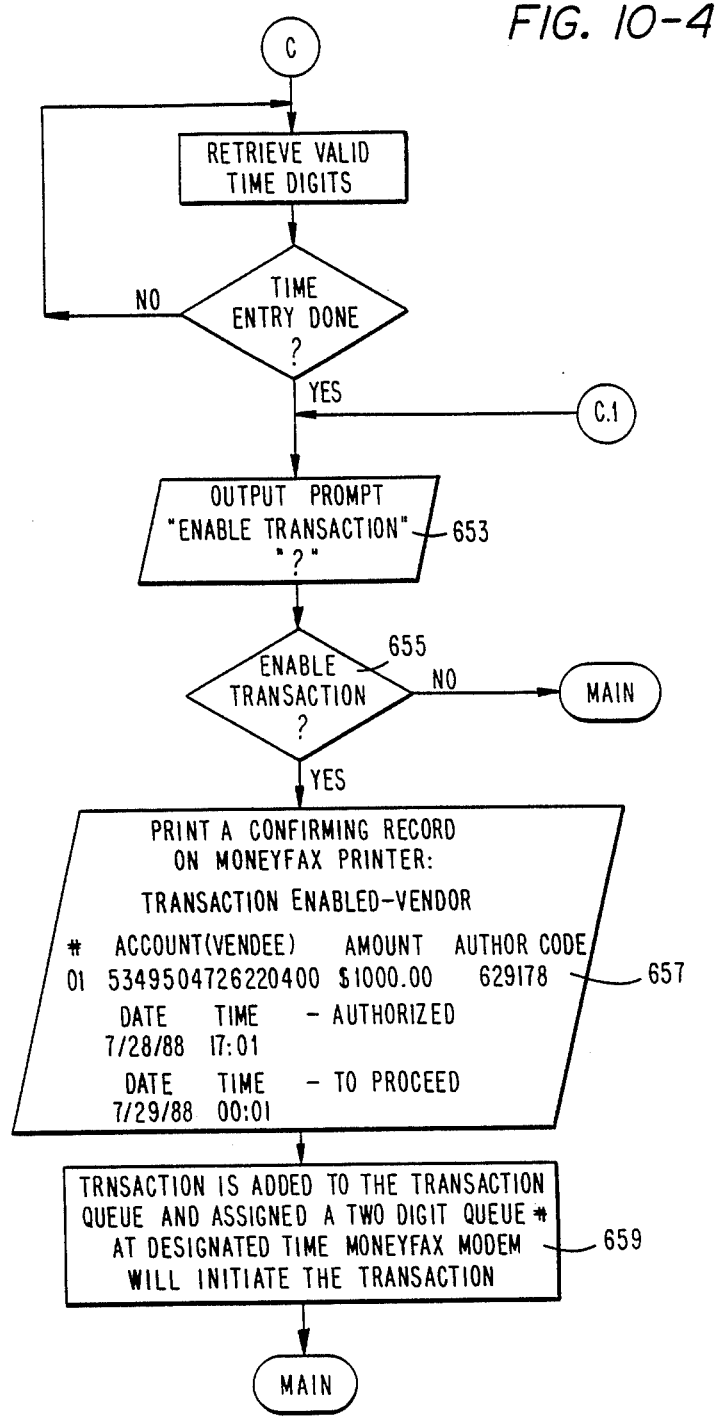
Figures 5, 10:
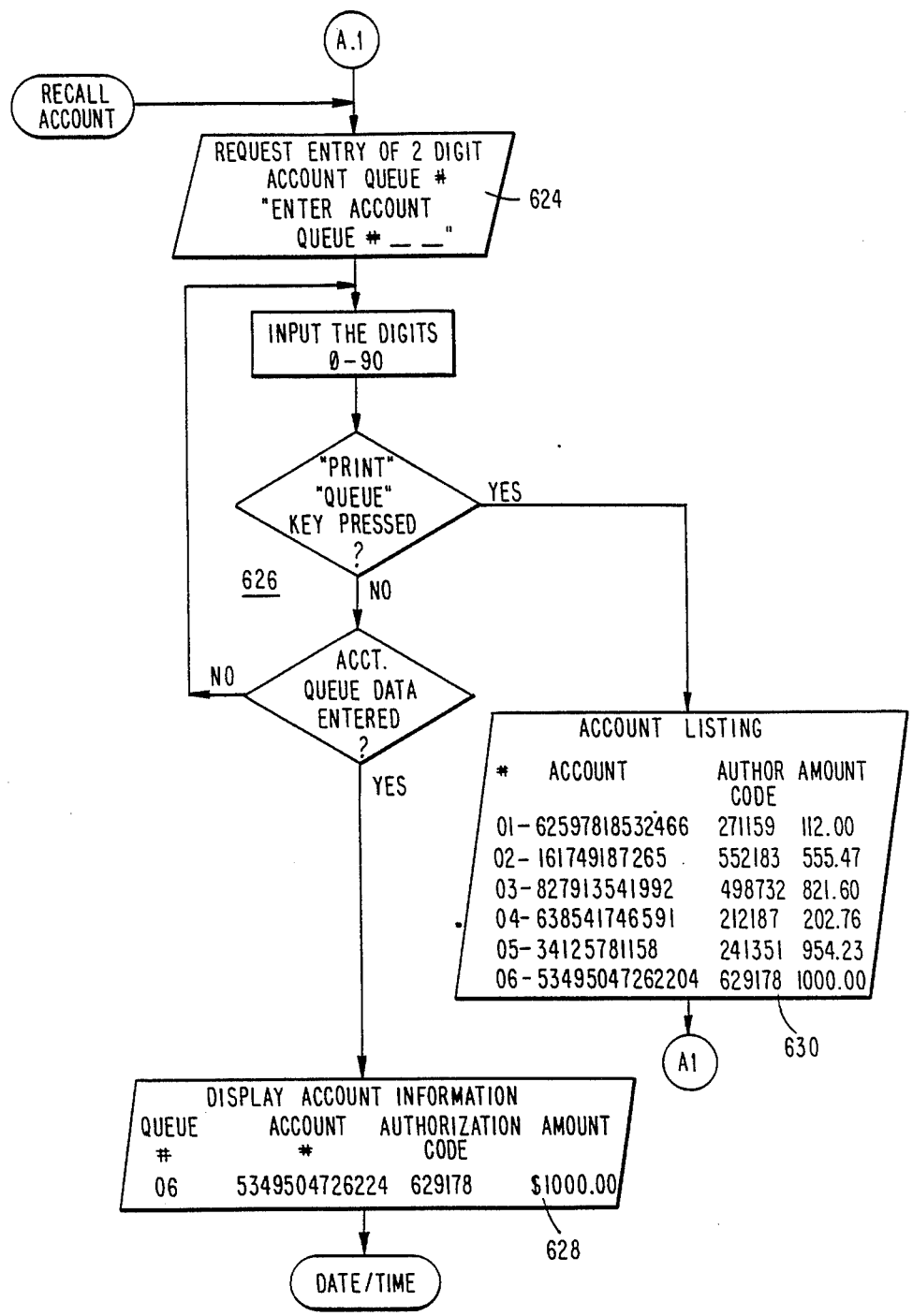
Figures 6, 10:
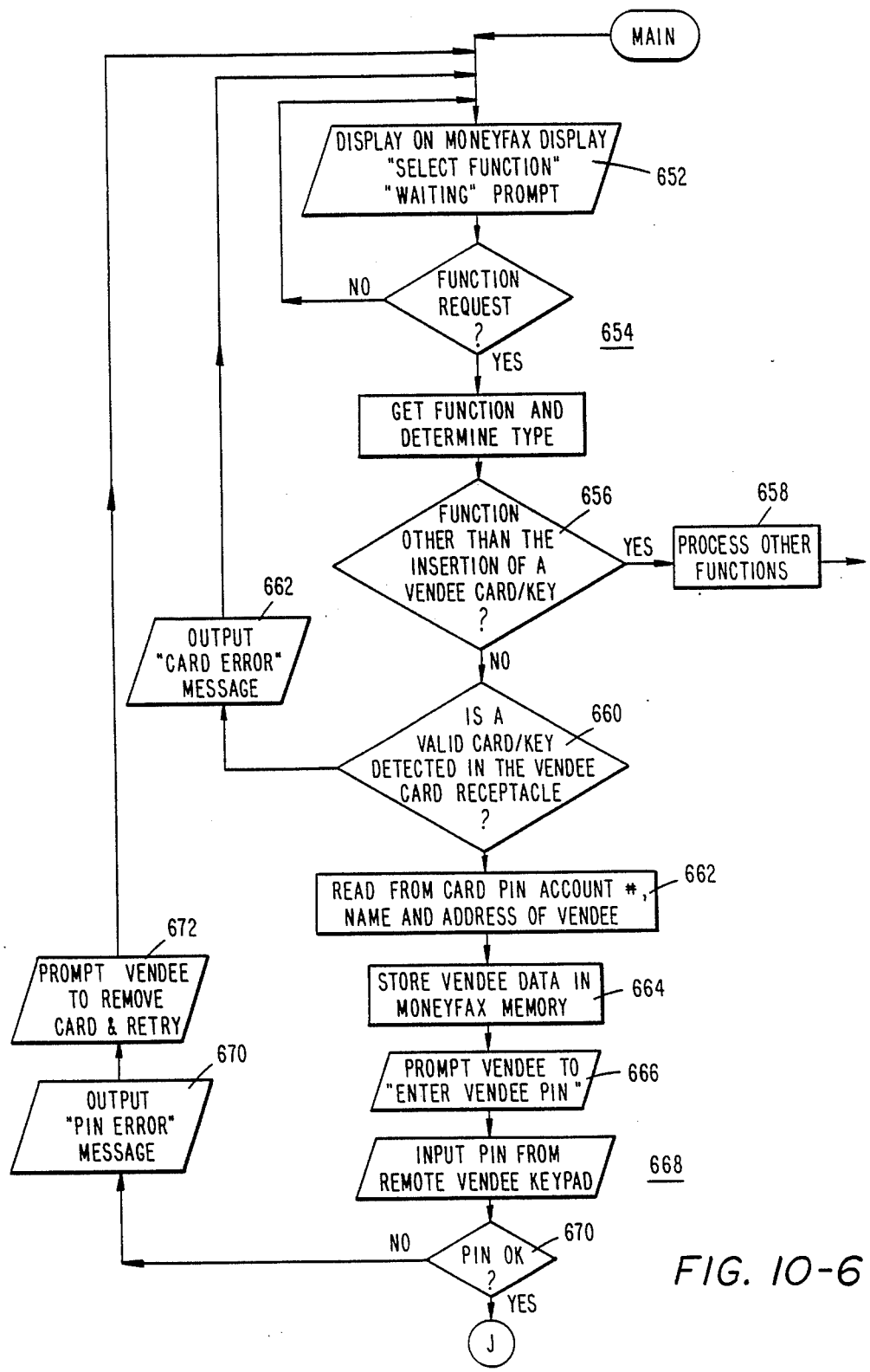
Figures 7, 10:
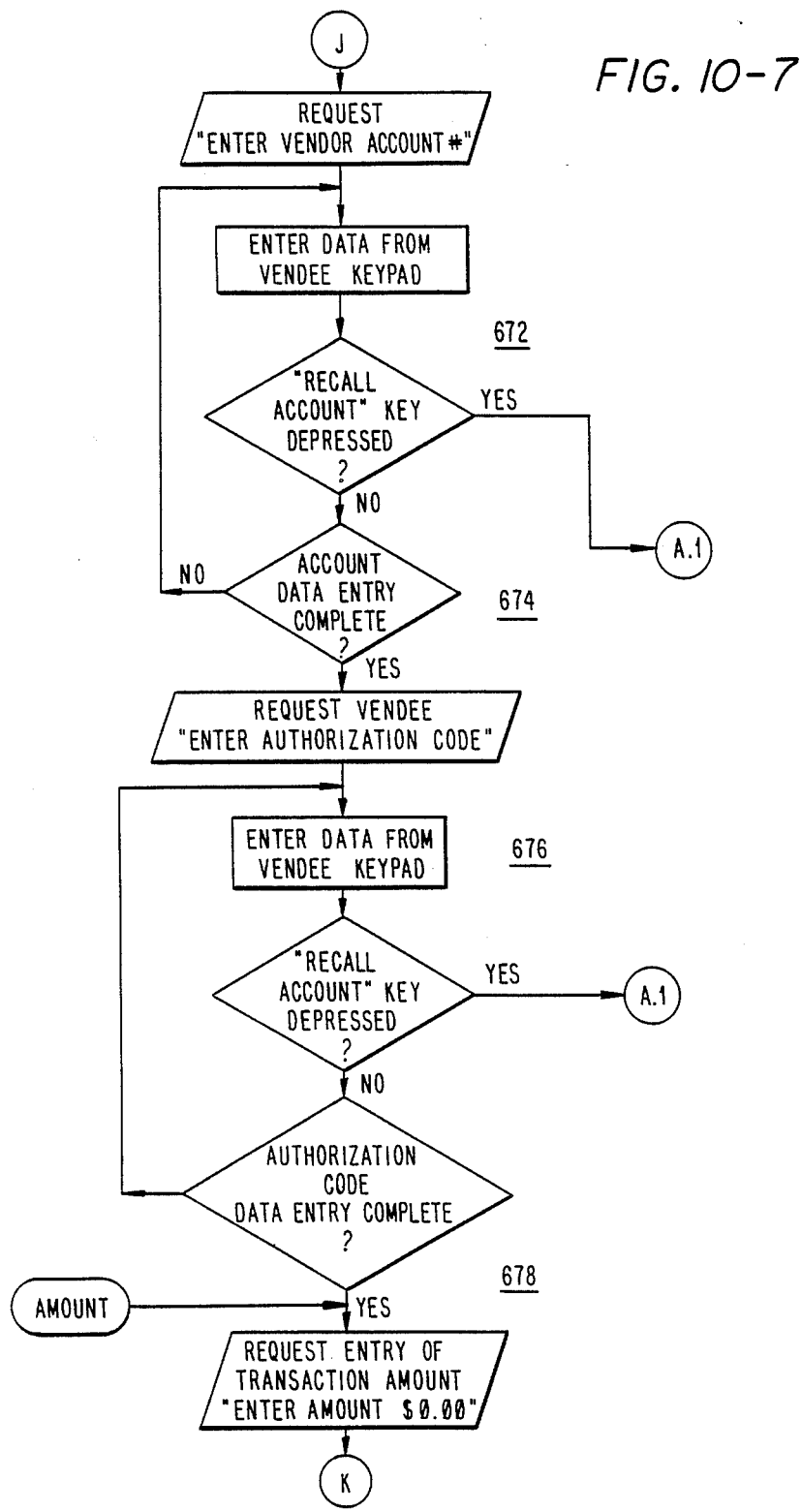
Figures 8, 10:
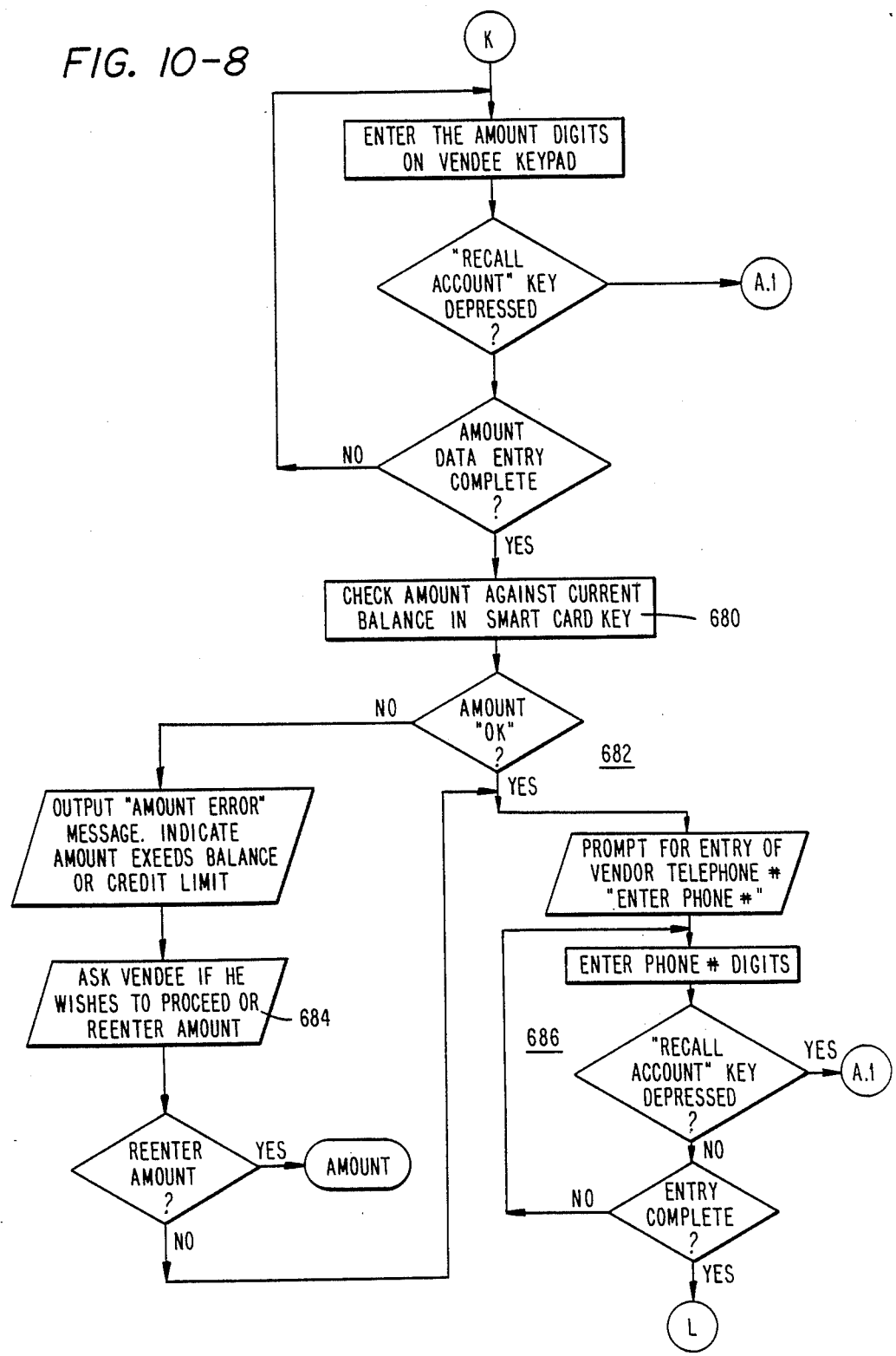
Figures 9, 10:
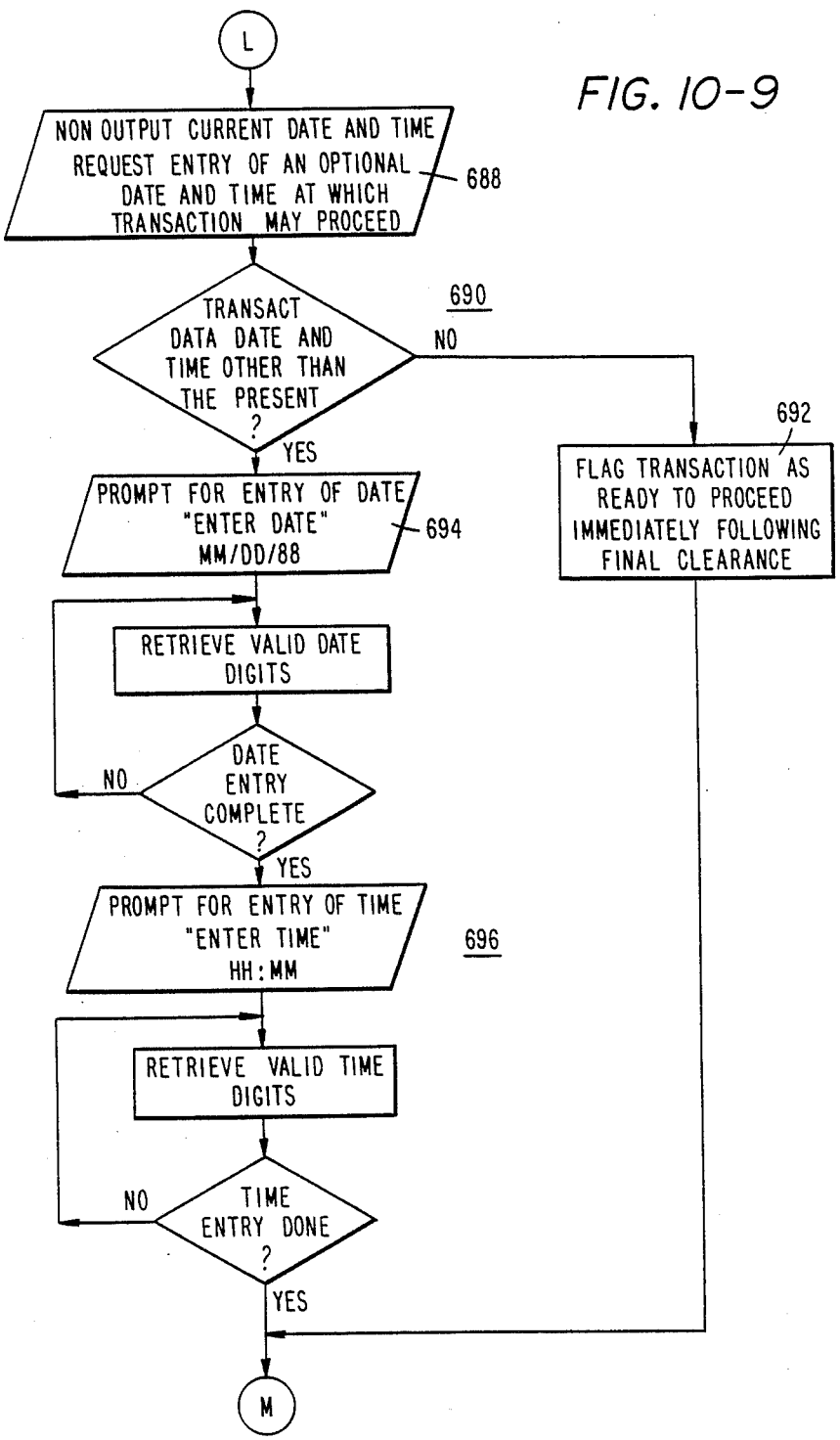
Figure 10:
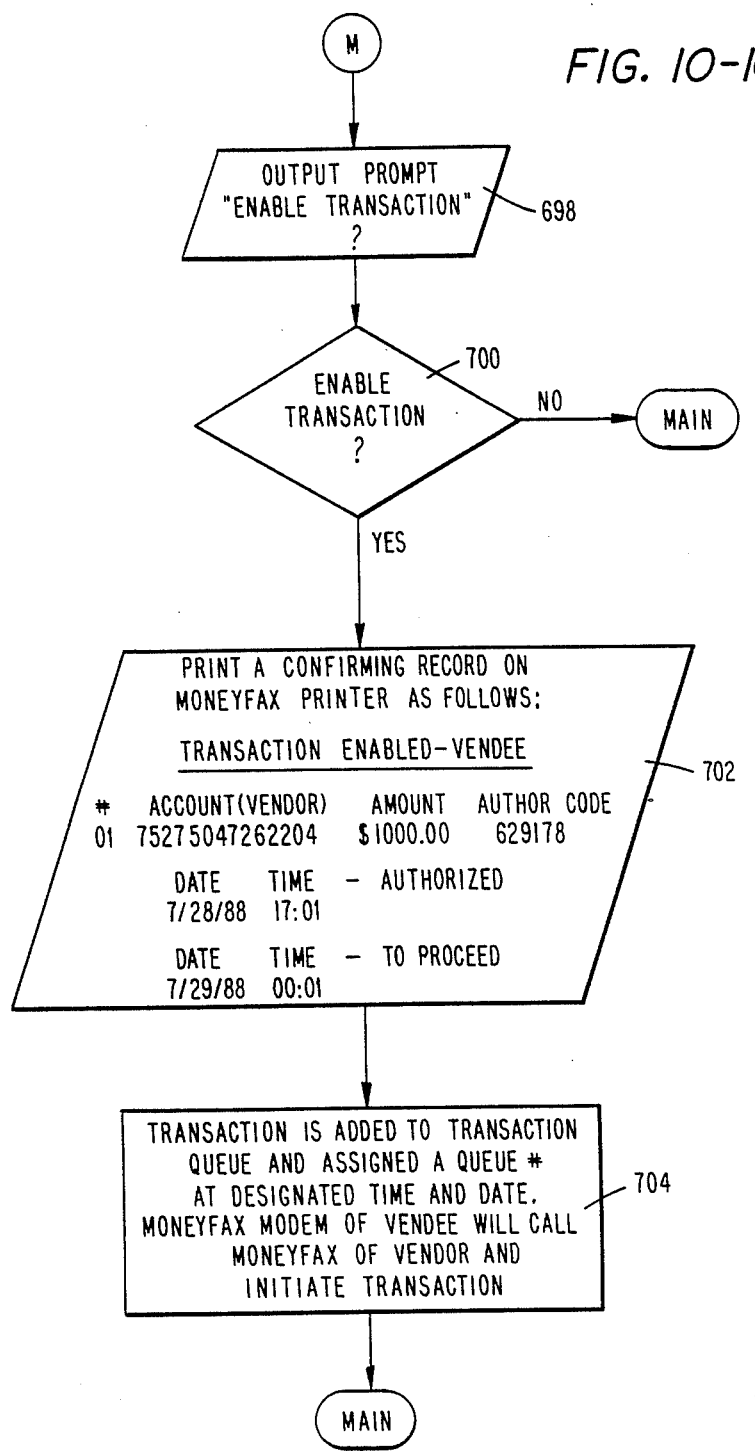

If the "RECALL ACCOUNT" key has not been depressed (step 632), or the subroutine of FIG. 10-5 has been completed (step 632), and the manual account data entry is complete (step 634), entry of the transaction authorization code is prompted (step 636). However, the authorization code may automatically be generated by microprocessor 160 (FIG. 8) of unit 102 which algorithmically combines the current account number, amount, date and time. Alternatively, the authorization code as well as other transactions can be recalled (step 638) by operating the "RECALL ACCOUNT" key which carries out execution of the subroutine of FIG. 10-5.

Thereafter, the seller unit displays an "ENTER AMOUNT" prompt (step 640), which may be manually entered by the seller if it is not recalled from the account queue. The amount of the transaction is keyboard entered by the seller (step 642) if not obtained from the transaction queue (step 644), and the current time and date, stored in the real time clock, are obtained (step 646) if the transaction is to be carried out immediately; otherwise, the seller is prompted to keyboard enter an optional date and time in which the transaction shall later be carried out (step 648). This facility permits "batching" of transactions at times when telephone line charges are reduced. In other words, the seller can make agreements with buyers to carry out transactions, automatically, in the middle of the night when telephone charges are reduced; a number of transactions are thus completed in succession without manual involvement by the seller and buyer.

Deferred transaction along the lines described is controlled by the program beginning at step 650 wherein the date and time of the transaction are manually entered by the seller, and the unit 102 displays an "ENABLE TRANSACTION" prompt (FIG. 10-4, step 653). If the transaction is enabled by the seller, in step 655, a completed transaction data packet is stored in the account queue, together with a two-digit account queue code. The packet includes the following information:

ACCOUNT NUMBER, TRANSACTION AMOUNT AUTHORIZATION CODE, DATE AND TIME, SELLER ACCOUNT NUMBER, AMOUNT, and AUTHORIZATION CODE.

A transaction record is printed by the facsimile printer, in step 656, as shown, the authorized transaction is carried out at the designated date and time (step 658); and the program returns to the beginning.

The operating sequence at the buyer unit 120 is as follows. The buyer unit initially displays the "SELECT FUNCTION WAITING" prompt, in step 652. The keyboard keys and card/key receptacle are scanned to determine whether a function carried out at the buyer unit 120 is a key depression or insertion of a card/key (step 654). If the function is determined to be the operation of a key (step 656), the required function is carried out (step 658); if the function is the insertion of a card/key, step 660, the card/key is tested to determine its validity and, if necessary, a "CARD ERROR" message is displayed (step 662).

If the card/key is determined to be valid, the personal identification number, account number and name and address of the buyer are read from the card/key (step 662). This is carried out by the card/key microprocessor which transmits an identification key to the unit 102, formatted as follows:

PIN, ACCOUNT NUMBER, NAME, ADDRESS, CITY, STATE, ZIP CODE

The string is stored in specifically allocated memory locations within the random access memory of the unit (step 664), and the buyer is prompted to enter his personal identification number (step 666).

If the personal identification number, keyboard entered by the buyer, is incorrect following three attempts (step 668), an error message is displayed (step 670) and the buyer is prompted to remove his card and retry (step 672) On the other hand, if the personal identification number keyboard entered by the buyer matches the one stored in the memory of the buyer card/key (step 670), the buyer is prompted to keyboard enter the account number of the seller. Here it is assumed that the buyer has obtained the account number of the seller by previous agreement; however, the account number of the seller can be obtained from data previously stored in an account queue within the random access memory of the buyer card/key B, step 672, in the same manner as described previously with respect to the operating sequence of the seller.

When the account data are entered, either manually or by access to the account queue (step 674), the authorization code is requested and keyboard entered (step 676) or obtained from the queue. The amount of the transaction next is requested and keyboard entered (step 678), or recalled from the account queue.

The amount of the transaction now is compared with the account balance stored in the card/key of the seller, in step 680, and if the transaction amount requested exceeds the account balance, a warning message is displayed at the buyer unit, the transaction will not be authorized and no authorization code is assigned.

If, on the other hand, the transaction is approved (step 682), i.e., the amount of the transaction exceeds the account balance stored in the card/key of the buyer, the buyer is prompted to reenter the transaction amount (step 684). Assuming approval, the buyer next is prompted to enter the telephone number of the seller, unless that information is previously stored in the account queue (step 686). Upon completion, indicated by operation of the "ENTER" key of the buyer unit keyboard, the current date and time are displayed (step 688). The buyer is now given an option to proceed immediately with the transaction, or to keyboard enter a subsequent date and time to complete the transaction; this permits batching of buyer transactions at times when telephone line charges are reduced, as described earlier.

If the buyer elects to carry out the transaction immediately (step 690), the transaction is flagged for immediate execution (step 692); otherwise, the buyer is prompted to enter the date and time of the proposed transaction (step 694), and following entry (step 696), the buyer is prompted to approve the transaction in step 698.

Assuming that the transaction is enabled by the buyer, operating the "YES" key (step 700), the buyer unit generates a data packet which includes the following information

SELLER ACCOUNT NUMBER, TRANSACTION AMOUNT, AUTHORIZATION CODE, DATE AND TIME.

Again, the seller account number, amount, authorization code and seller identification number may be recalled from a data queue, if previously stored.

A transaction record is now printed by the facsimile printer (step 702), in the format shown, and the transaction is added to the transaction queue (step 04), and assigned a two-digit queue number. The transaction then is carried out between the seller and buyer immediately or at the designated time, and the program recycles to "start".

(3) Communication Protocol

Figures 1, 11:
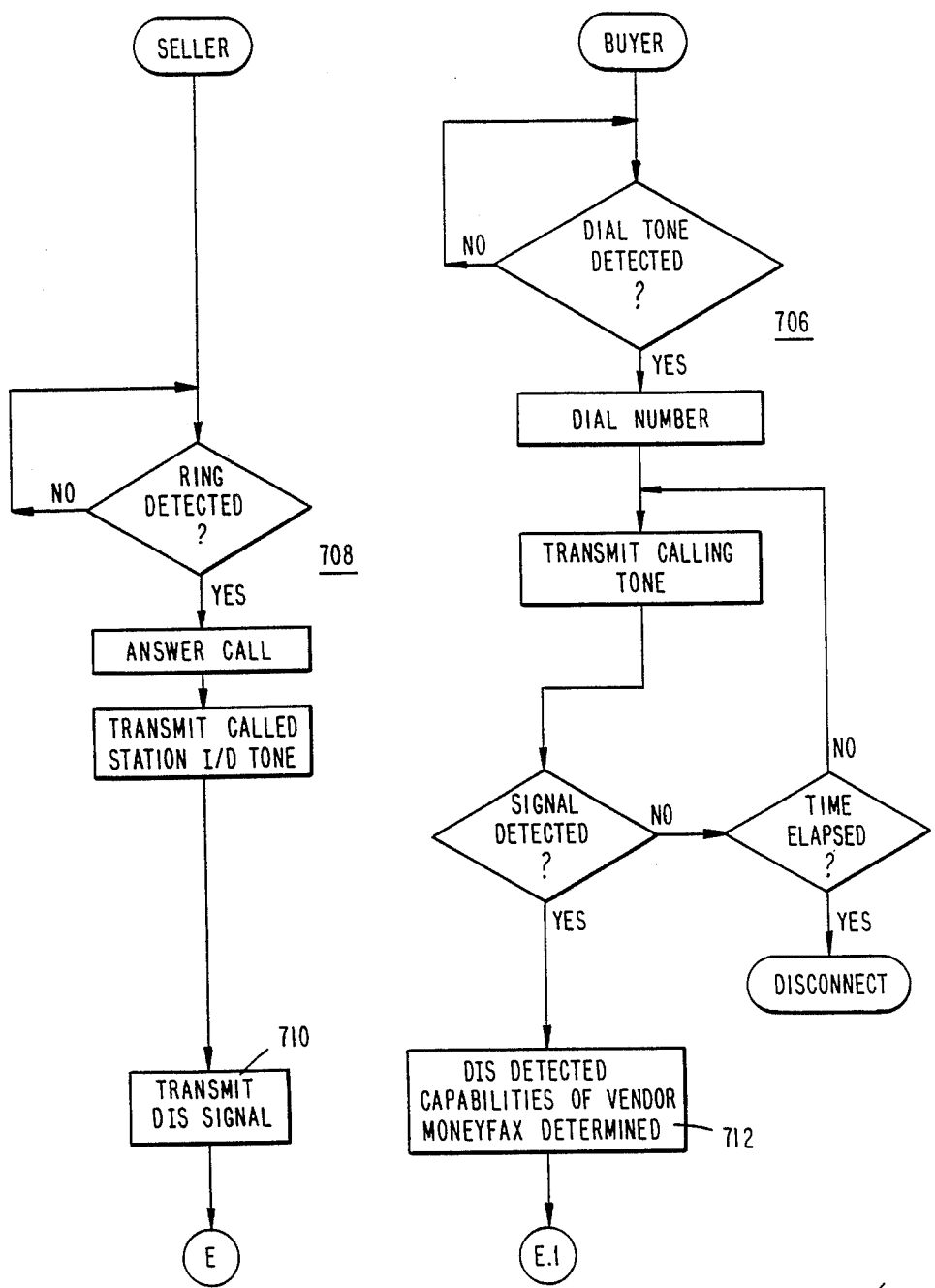
Figures 2A, 11:
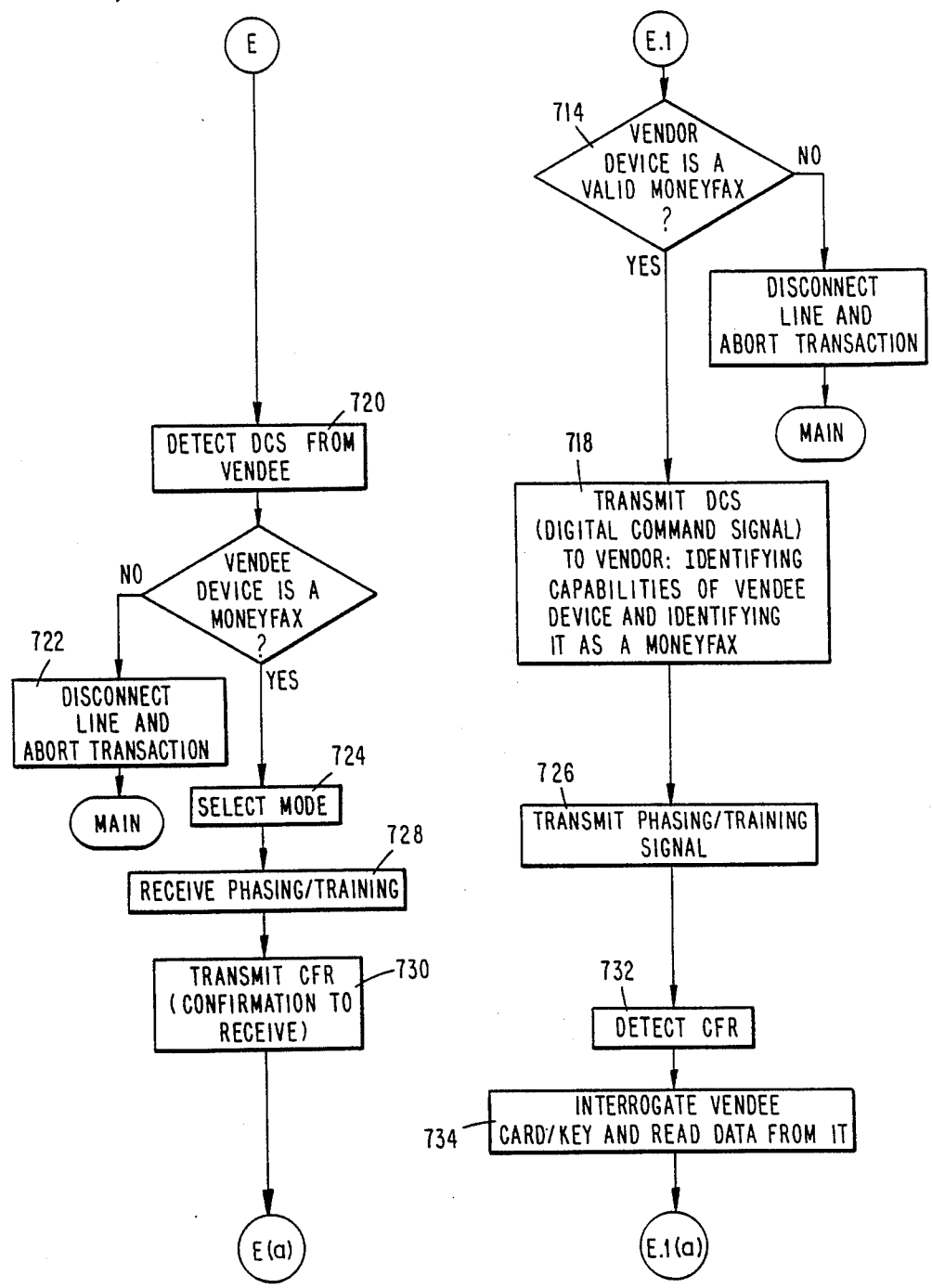
Figures 3, 11:
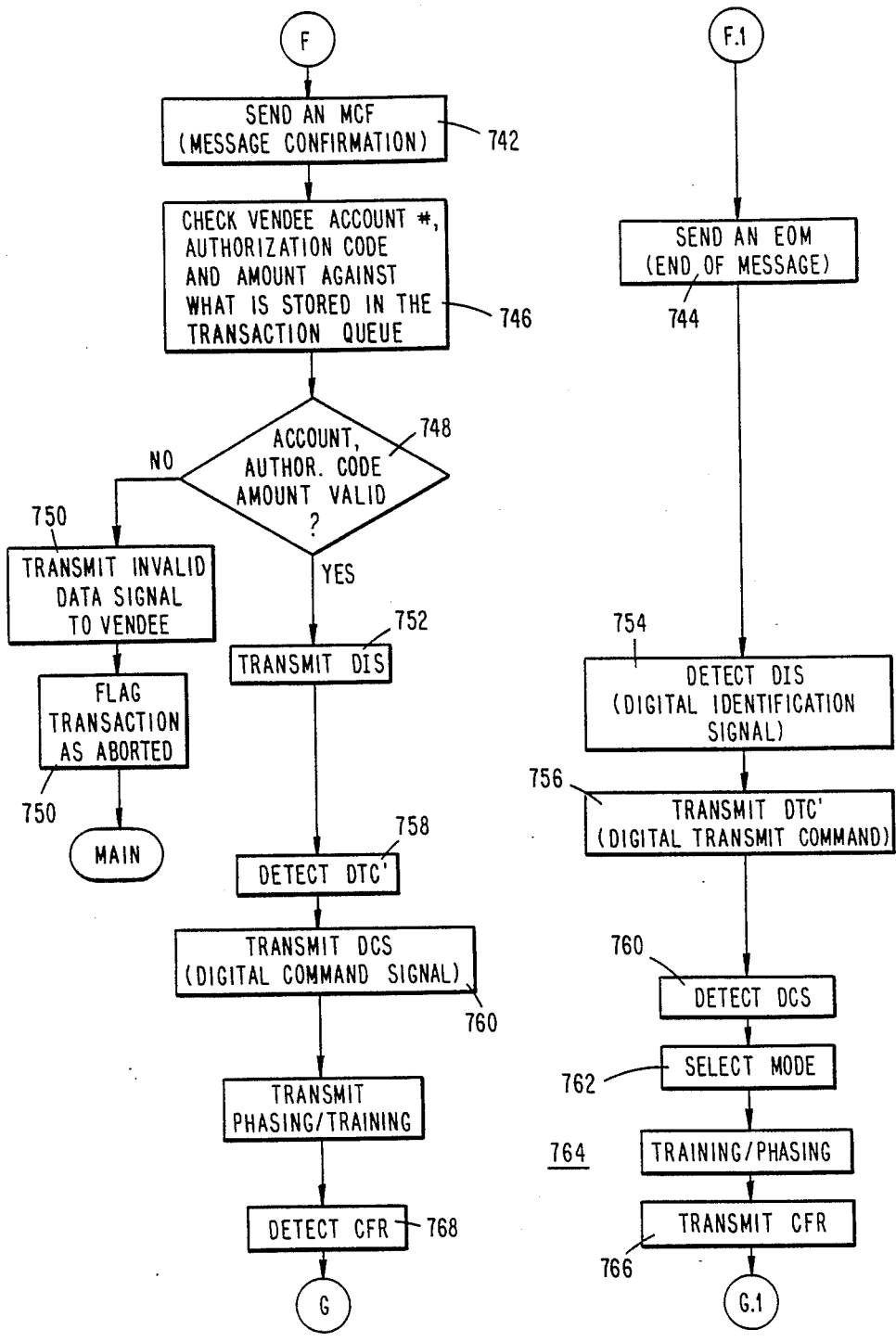
Figures 4A, 11:
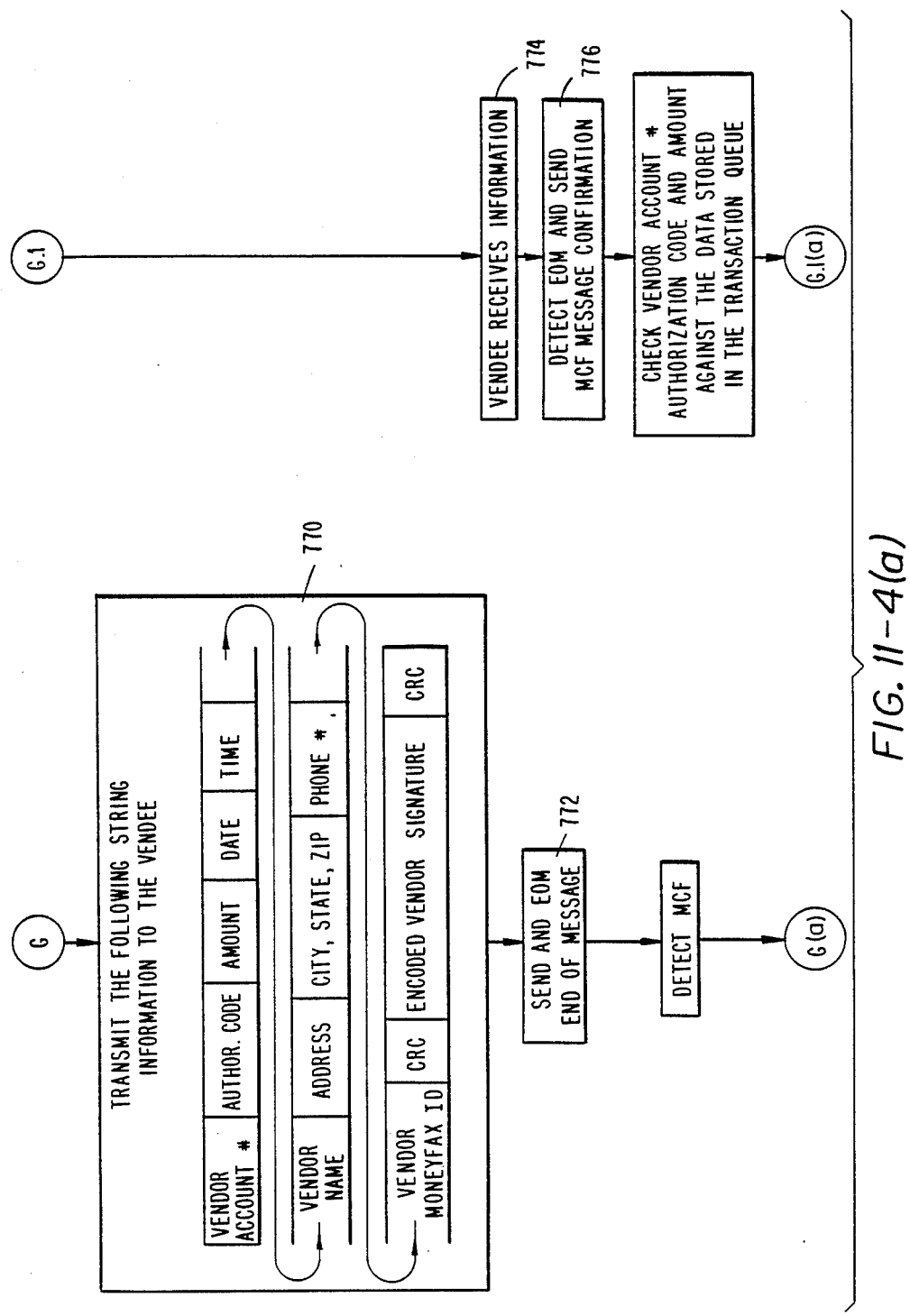
Figures 4B, 11:
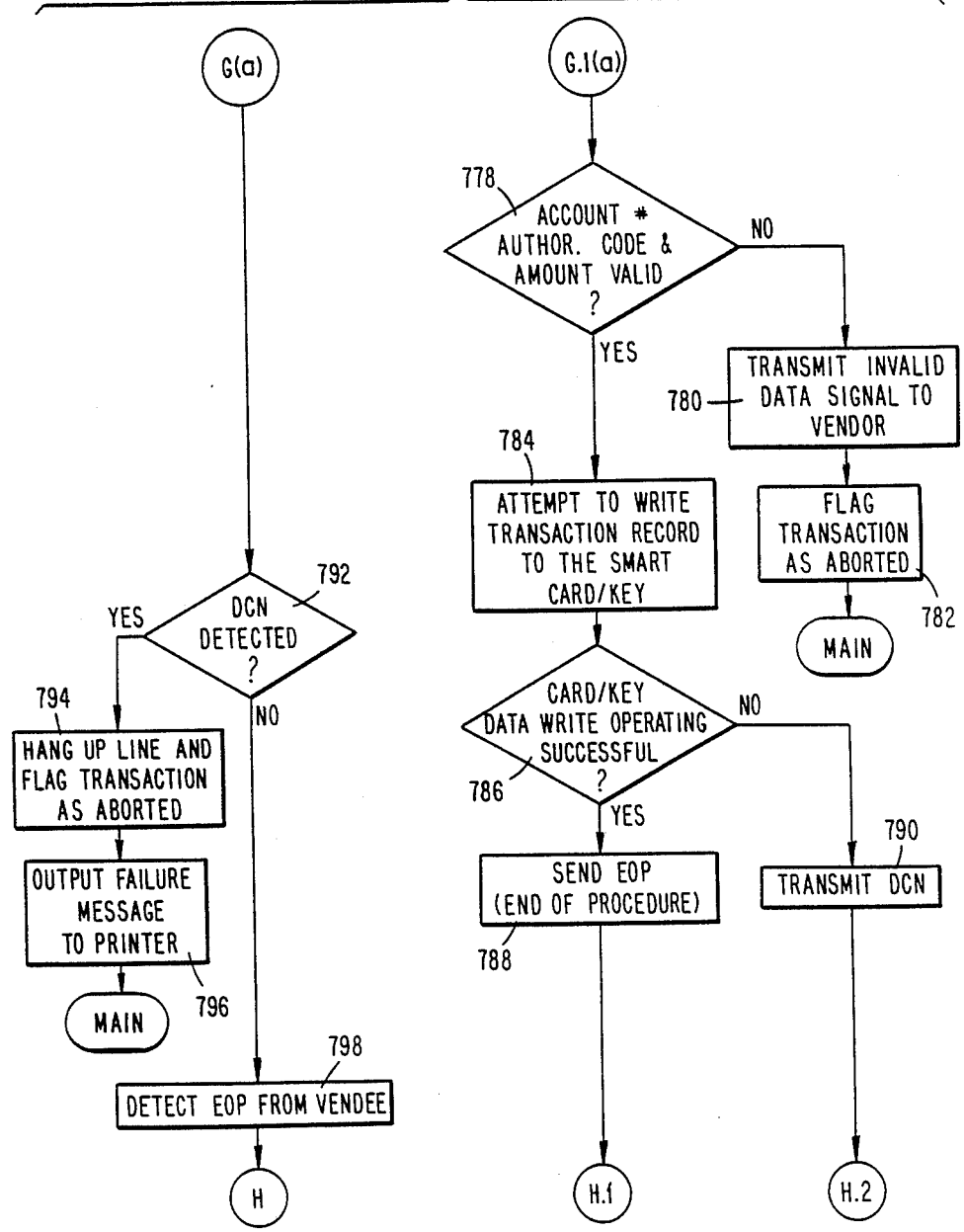
Figures 6, 11:
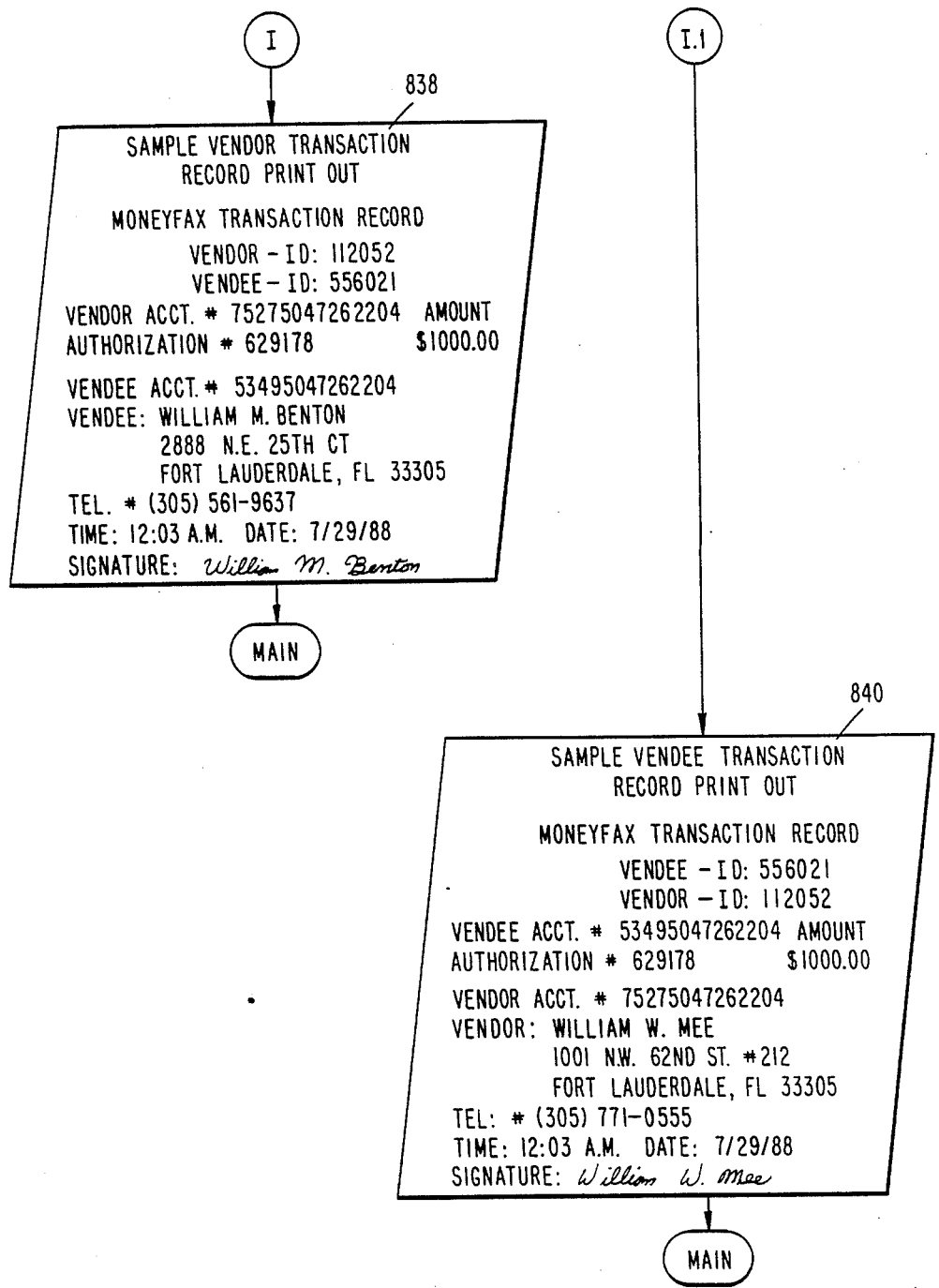

Now described is the sequence of operation which is carried out between the buyer and seller units which establish communication therebetween, automatically, to effect a transaction at the designated time. Thus, referring to the flow chart of FIGS. 11-1 to 11-5, assume that the seller and buyer have agreed to carry out a transaction in the amount of one thousand dollars at 12:01 A.M. on July 29, 1988. The left-hand side of the flow chart refers to the operating sequence of the seller unit and card/key, the right-hand side refers to the operating sequence of the buyer unit and card/key.

In step 706, the buyer unit is placed on-line, and if a dial tone is detected, the telephone number of the seller unit is dialed. If the telephone of the seller unit rings, the seller unit answers (step 708) and communication between the seller and buyer unit is established using CCITT procedure T.30 protocol, carried out conventionally between facsimile machines in group 2 format; alternatively, other formats and protocols, such as group 3 format specified in CCITT recommendation T.4 can be utilized. In this regard, group 2 format, which allows image transmission at a vertical resolution of 100 lines per inch and a rate of six lines per second, typically requires approximately three minutes to transmit an eleven inch long page. Group 3 format, on the other hand, allows image transmission at a vertical resolution of either 100 or 200 lines per inch. To decrease transmission time, this format utilizes a digital compression technique which uses a combination of run-length and encoding and Huffman coding. The group 3 format allows transmission of the digital representation of an image at one of four data rates, 9600, 7200, 4800 or 2400 bits per second, selected to accommodate the quality of the telephone connection and to match the capabilities of the transmitter and receiver facsimile units. Group 3 format allows transmission of a typical page of text in less than a minute when the 9600 bits per second rate is used.

Thus, the seller unit 102 transmits to the buyer unit a digital identification signal (DIS) as outlined in procedure T3.0, containing information about the facsimile machine, such as vertical and horizontal scan line times (step 710). Meanwhile, the buyer unit detects the DIS signal and determines its compatibility (step 712), i.e., the buyer unit confirms that it is in communication with a facsimile machine that is able to carry out a transaction (step 714). If the buyer unit determines that it has contacted a facsimile machine that cannot carry out financial transactions, communication is aborted (step 716); otherwise, it transmits a digital command signal (DCS) to the seller unit to confirm that it is compatible therewith (step 718), which signal is detected by the seller unit 102 (step 720). Meanwhile, if the seller unit has determined that the machine calling is a facsimile machine that is not capable of carrying out transactions, the seller unit aborts communication (step 722); otherwise, the mode of communication is selected, depending upon telephone line conditions, etc. (step 724).

The buyer unit next transmits a phasing/training signal (step 726) to the buyer unit, to verify the communication line, which signal is received by the seller unit (step 728).

The seller unit then transmits a confirmation to receive (CFR) signal to the buyer unit (step 730), which signal is detected (step 732), and in response, the buyer unit interrogates the card/key of the buyer to receive data stored therein (step 734). At the same time, the seller unit interrogates the contents of the card/key of the seller (step 736), and an image of the seller card/key data is read into the memory of the facsimile modem.

The buyer unit transmits to the seller unit the string of information shown in block 736, which is received by the seller unit in step 738. This is carried out by the buyer unit reading from the buyer card/key an image of the data contained therein as the card is first inserted into its receptacle. The end of message, transmitted by the buyer unit, is detected by the seller unit at step 740, and in response, a message confirmation signal (MCF), in step 742, is transmitted back to the buyer unit which has transmitted an end of message signal thereto (step 744). The seller unit checks the seller account number, authorization code and amount which is stored in its transaction queue (step 746) to determine validity (step 748). If there is no match, an "INVALID DATA SIGNAL" message is transmitted to the buyer unit (step 750) and the transaction is flagged as aborted due to invalid data in the account, amount, or authorization code field (step 752) and the program returns to the beginning thereof.

Assuming that the transaction requested is determined to be valid, on the other hand, in step 748, the seller unit transmits an image string of its transaction data to the seller unit (step 752), whose digital identification signal (DIS) is detected by the buyer unit (step 754). The buyer unit transmits a digital transmit command to the seller unit (step 756), requesting transmission of transaction data from the seller unit. This request is detected by the seller unit, in step 758, which in response, transmits a digital command signal back to the seller unit (step 760), all in accordance with CCITT procedures.

The buyer unit detects the digital command signal, in step 760, and selects its mode of operation (step 762). Training/phasing signals are exchanged between the buyer and seller units (step 764); the buyer unit transmits a confirmation to receive signal, in step 766, which signal is detected by the seller unit (step 768) which, in response, transmits the string of data shown in block 770, followed by an end of message bit (step 772), to the buyer unit.

The buyer unit receives the information, in step 774, and, in response, transmits a message confirmation signal (step 776) back to the seller unit. The message confirmation signal is detected by the seller unit while the vendor account number, authorization code and amount received by the buyer unit are compared to the corresponding data stored in the transaction queue. If there is not a match, determined in step 778, an invalid data signal is transmitted back to the seller unit (step 780) and the transaction is aborted (step 782).

If the transaction matches, on the other hand, the transaction data are recorded in the random access memory of the buyer card/key (step 784), and if these data are successfully written to the card/key, as determined in step 786, an End of Procedure signal is transmitted to the seller unit (step 788); otherwise, an error signal is transmitted back to the seller unit in step 790, which signal is detected, in step 792. The seller unit, in response, aborts communication (step 794), and displays a failure message (step 796), to the seller. Otherwise, the end of procedure message transmitted by the buyer unit is detected in step 798.

Meanwhile, if the buyer unit has not successfully transferred the record data to its card/key, communication by the buyer unit is aborted (step 800), and a transaction failure message, together with a report of the cause, is printed by the facsimile machine at the buyer site (step 802).

Assuming that the buyer unit has successfully transferred the transaction record to its card/key, the seller unit attempts to write the transaction record to the card/key of the seller (step 804). If unsuccessful, disconnect signal (DCN) is transmitted to the buyer unit (step 806), the communication is aborted (step 808), and a failure message, together with cause of failure, is printed by the facsimile machine at the seller site (step 810). Assuming, however, that the transaction record is written successfully to the card/key of the seller (step 812), the seller unit transmits a message confirmation signal to the buyer unit (step 814), and the transaction is logged as completed so that the card/key of the seller is instructed to store the transaction as a permanent record (step 816) as the communication with the buyer unit is terminated (step 818), and the transaction record is printed by the facsimile machine at seller site (step 820).

Meanwhile, at the buyer site, a disconnect signal has been received because the seller unit did not successfully store the transaction record into the card/key of the seller (step 822), the buyer unit terminates communication with the seller unit (step 824), and the transaction record is deleted (step 826), and an indication of the failure is printed (step 828).

On the other hand, assuming that the seller unit has successfully stored the transaction in the card/key of the seller, the buyer unit detects the message confirmation signal transmitted to it by the seller unit (step 830), communications are terminated (step 832), and the card/key of the buyer is instructed to log the transaction as complete (step 834). Finally, the transaction record is printed (step 836).

The transaction records printed at the seller and buyer sites are mirror images of each other, as shown in blocks 838 and 840, with the buyer and seller facsimile signatures obtained from the read only memories of the buyer and seller of card/keys, included in the transaction records to form facsimile sales contracts.

(4) Upload/Clearing Mode

Figures 1, 12:
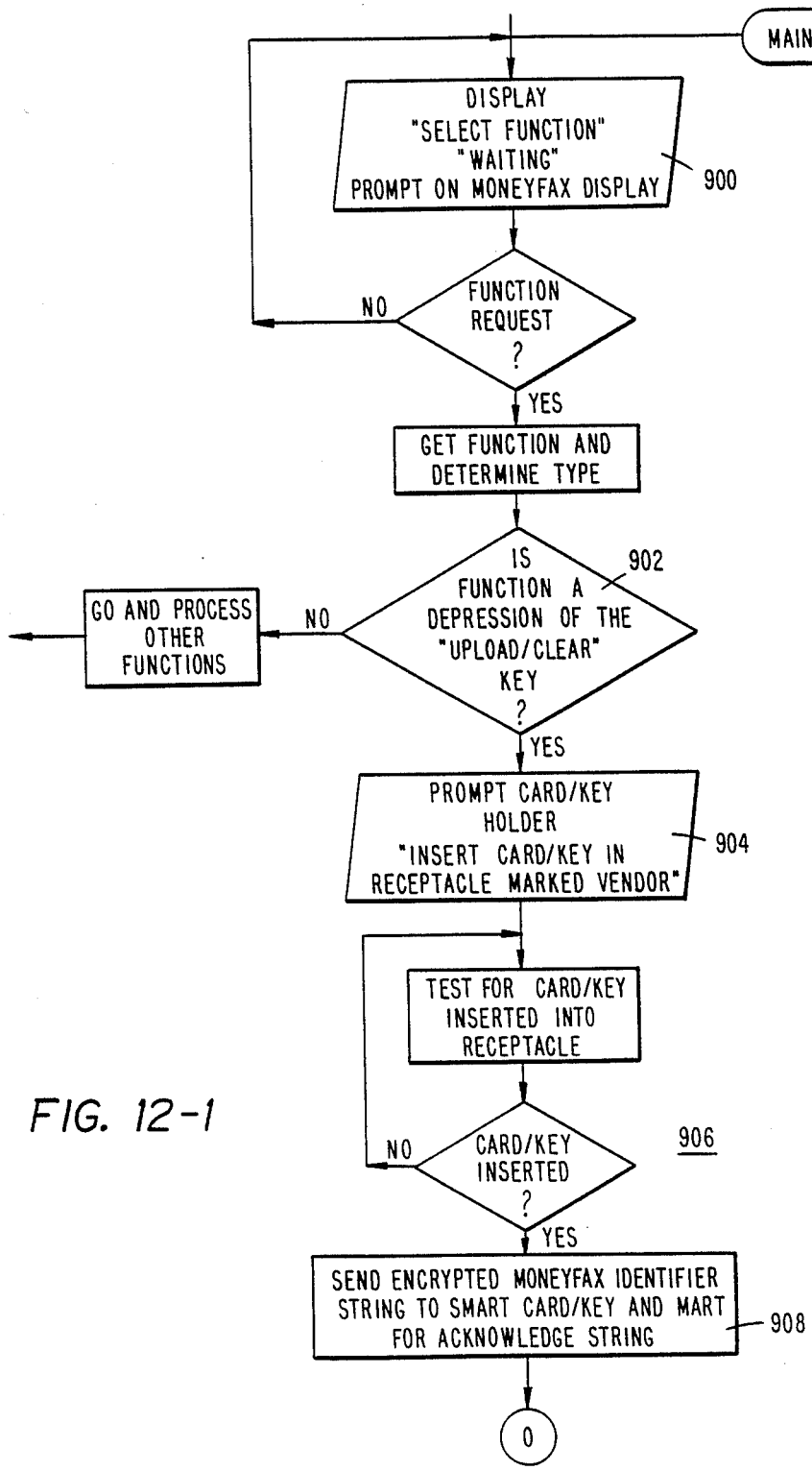
Figures 2, 12:
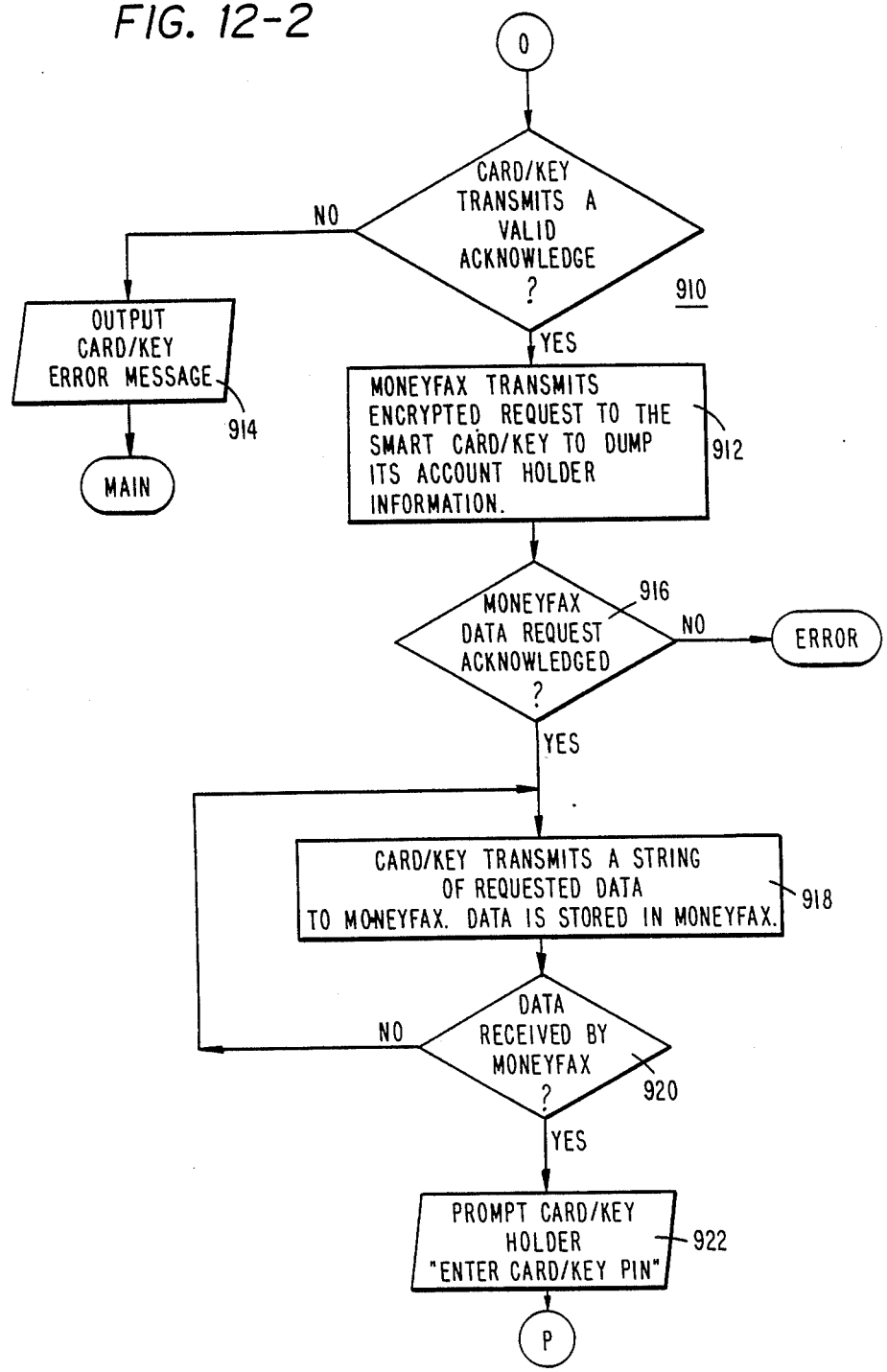
Figures 3, 12:
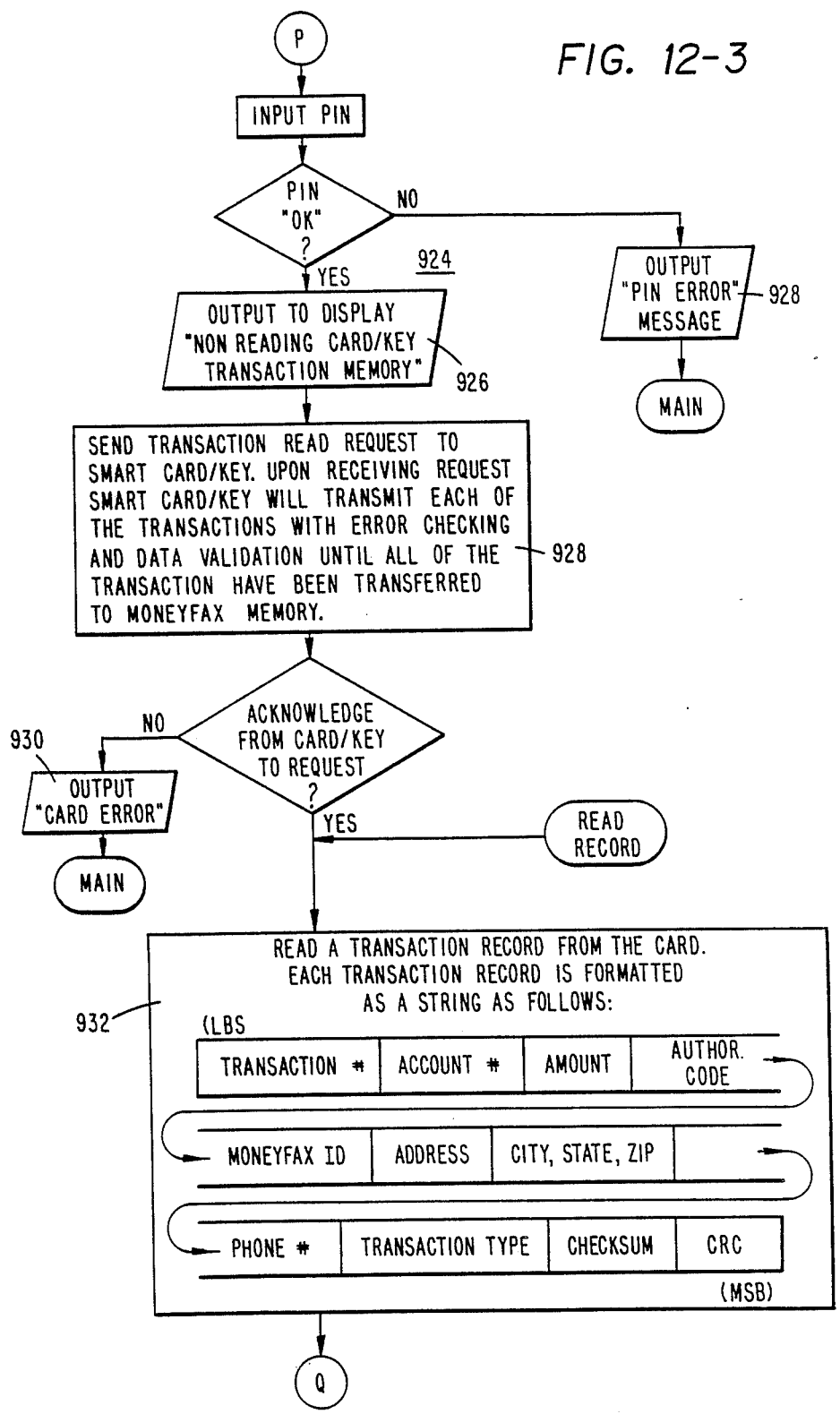
Figures 4, 12:
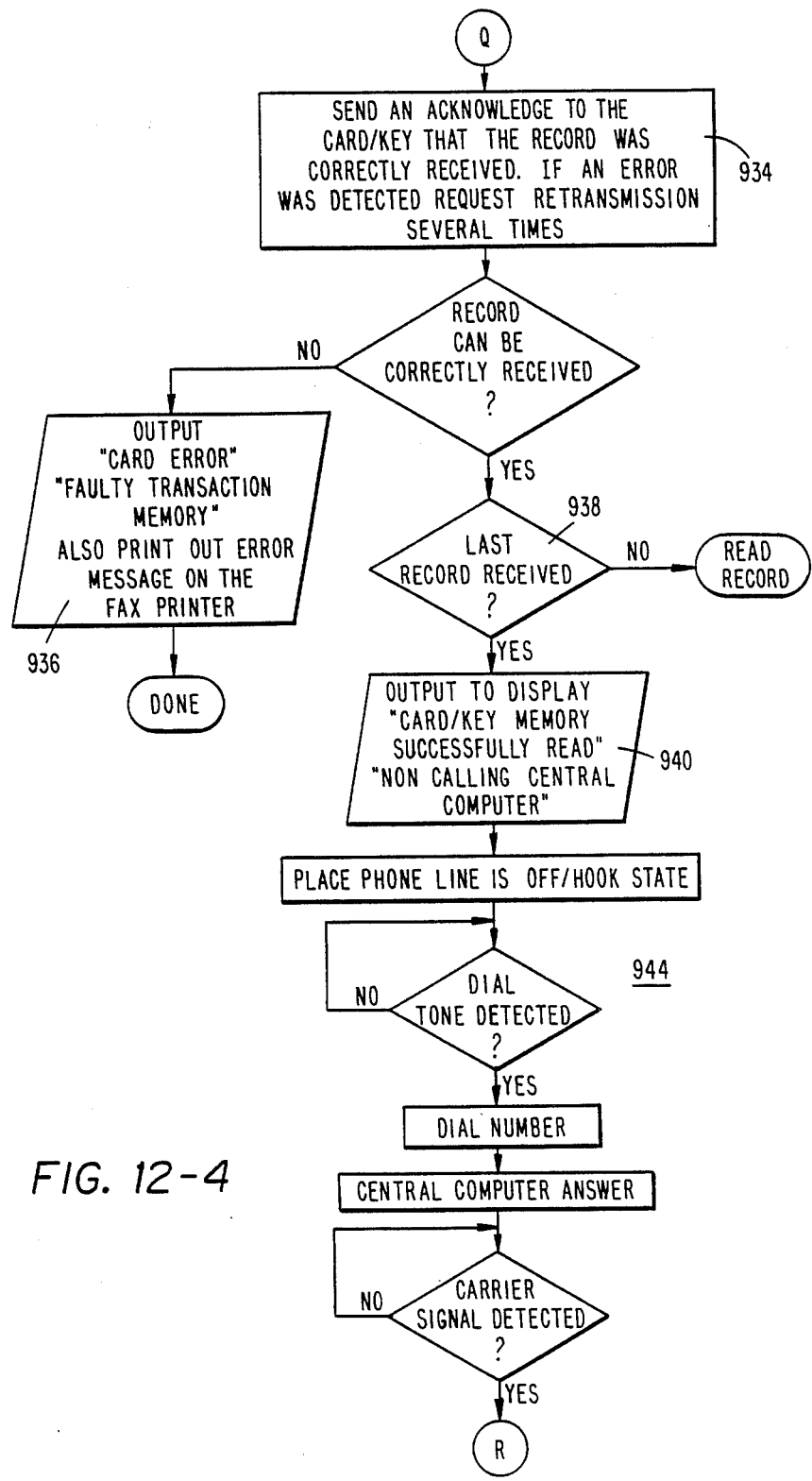
Figures 5, 12:
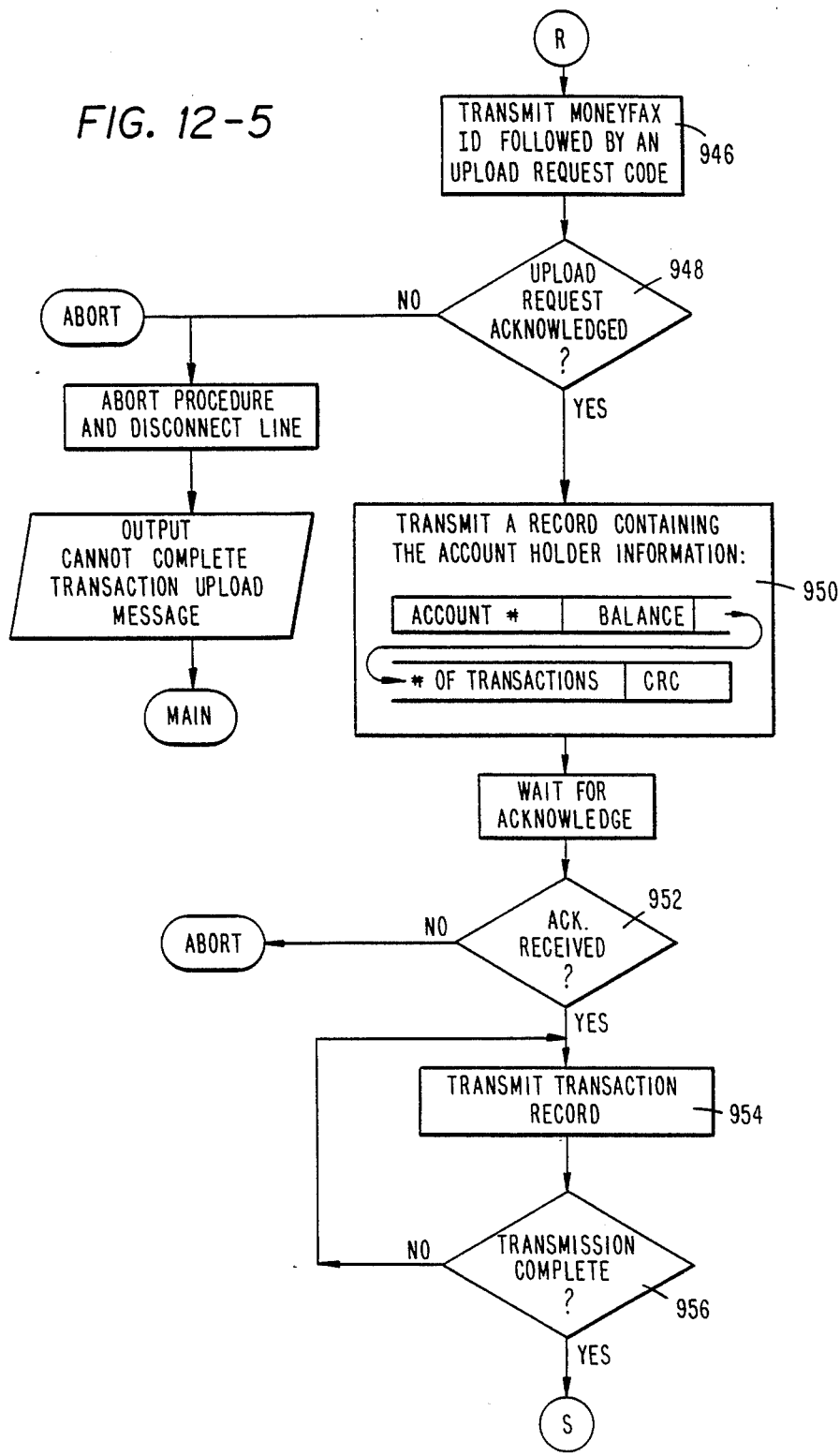
Figures 6, 12:
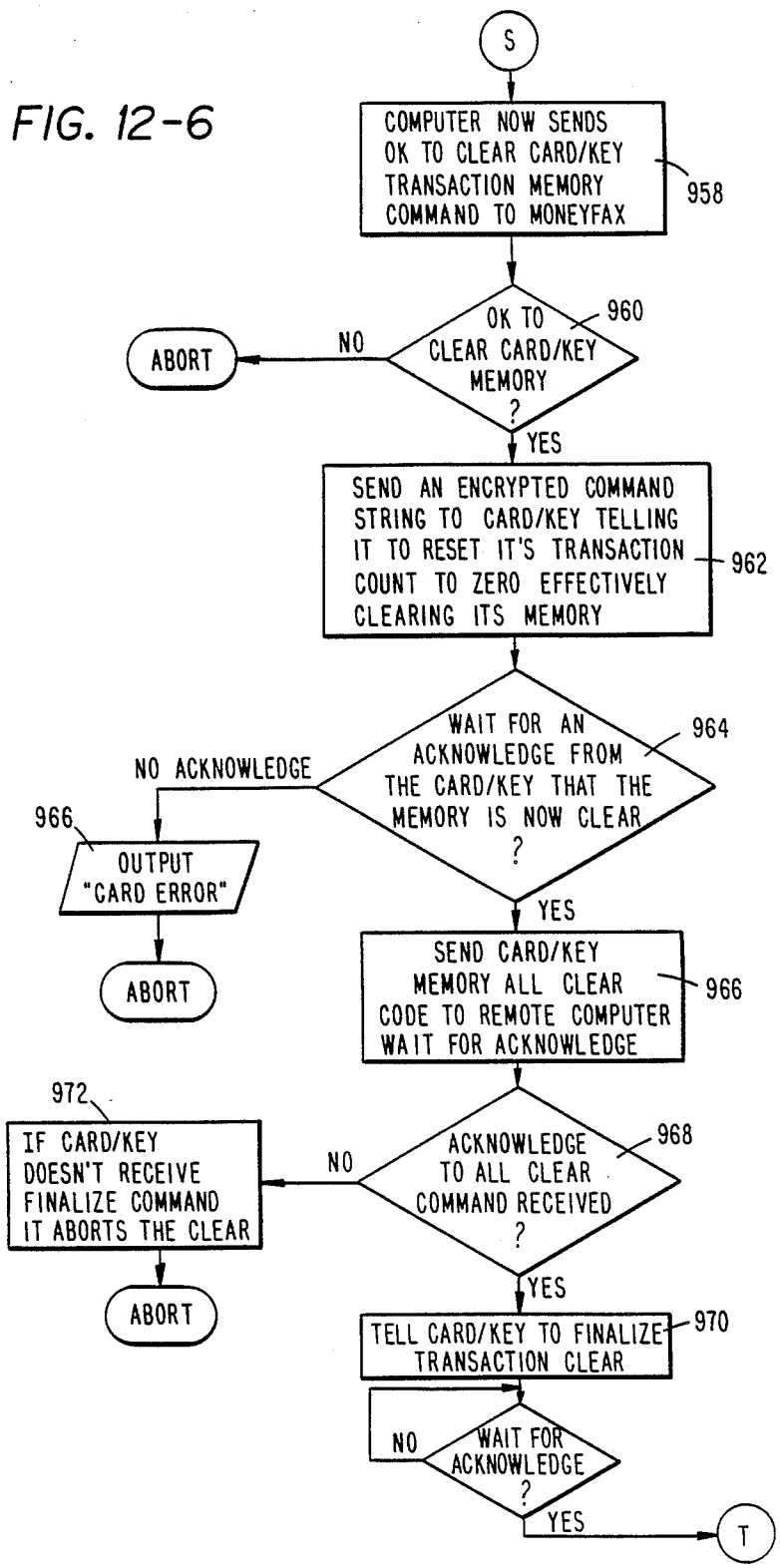
Figures 7, 12:
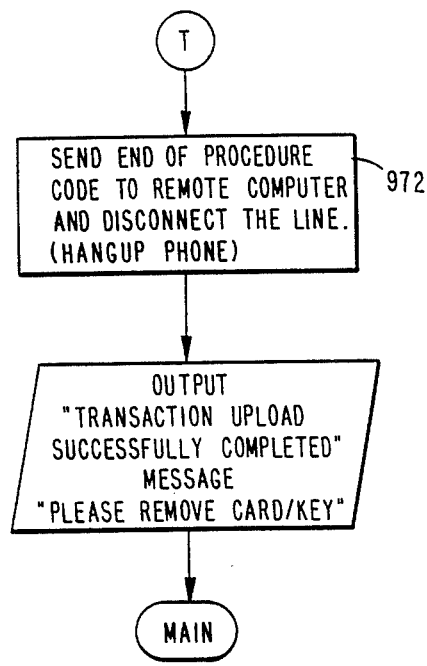

Now described with reference to FIGS. 12-1 to 12-7 is the operating sequence of the unit 102 in the transaction clearing mode of operation, wherein transactions carried out by each facsimile seller unit 102 are reported to a central computer for reconciliation. Thus, assuming initially that the display of unit 102 is in the "SELECT FUNCTION WAITING" prompt (step 900), the program determines whether the function requested is an operation of the "UPLOAD/CLEAR" key of the keyboard (step 902). If so, the card/key holder is prompted to insert his card/key in the seller receptacle 118 (step 904), and the card/key is detected (step 906). The seller unit 102 now interrogates the card/key to determine validity (step 908). If the card/key is determined to be valid, by transmitting a proper acknowledgement in response to an encrypted identifier string transmitted by the facsimile machine (step 910), the facsimile machine requests the card/key to dump its account holder information (step 912); otherwise, if the card/key is determined to be invalid, an error message is displayed (step 914).

The card/key transmits a string of data to the random access memory of the facsimile machine, having the following format:

PIN, ACCOUNT NUMBER, ACCOUNT NAME, ADDRESS, CITY, STATE, ZIP CODE, TELEPHONE NUMBER and SIGNATURE IMAGE.

If the data request is acknowledged by the card/key, in step 916, the card/key transmits these data to the random access memory of the facsimile 102, stored therein within a continuous block allocated to the holder of the card/key (step 918). Upon completion, determined in step 920, the card/key holder is prompted to enter his personal identification number (step 922).

If the personal identification number, keyboard entered by the cardholder, matches, the personal identification number stored in the card (step 924), the seller unit displays the message "NOW READING CARD/KEY TRANSACTION MEMORY" (step 926); if the personal identification number keyboard entry by the cardholder does not match the numbers stored in the card, and error message is displayed (step 928).

A transaction read request is now sent to the card/key, and in response, the card/key transmits each transaction, together with error checking and data validation, until all the transactions have been transferred from the card to the random access memory of the facsimile machine (step 928). If the request is not acknowledged by the card/key, there is a defect in the card, and an error message is displayed (step 930); otherwise, transactions are read from the card in the format shown in step 932.

In step 934, an acknowledgement is sent to the card/key that the record was correctly received. If, on the other hand, an error is detected, retransmission is requested several times. If the record cannot be correctly received error-free from the card/key, an error message is displayed, and the process is aborted (see also step 936).

If all records are correctly transferred from the card/key to the buyer unit 102 (step 938), an acknowledgement is displayed, in step 940. The seller unit now places a telephone call to the central computer (step 944).

When the central computer is called, if a dial tone is not detected within a preset period of time, or the carrier signal from the remote computer modem is not detected, then a time out abort sequence is carried out and an appropriate error message is both displayed and printed.

When communication with the central computer is established, the identification number of seller unit 102 is transmitted to the central computer (step 946), and the seller unit transmits an upload request. If the central computer does not acknowledge the upload request, communication between the seller unit and the central computer is aborted (step 948). If the upload request is acknowledged, on the other hand, transaction records stored in the random access memory of the seller unit are uploaded, as shown in step 950).

If there is no acknowledgement from the central computer of the uploaded data, communication is aborted (step 952); otherwise, transaction records continue to be transmitted to the central computer (step 954). This is carried out by the transmission, following each record, of an acknowledge, negative acknowledge (ACK/NAK) sequence, with attempted multiple transmission. If there is a data transfer failure, an abort sequence will be executed.

Upon completion of the transmission of transaction records, in step 956, the central computer transmits a command to clear the transaction memory of the seller unit, in step 958. Upon clearance of the memory of the card/key resident in the seller unit (step 960), and encrypted command string is transmitted by the central computer to the card/key to clear the memory thereof (step 962). The card/key then transmits an acknowledgement to the central computer that its memory has been cleared (step 964); otherwise, an error message is displayed (step 966) at the seller unit. If the memory is clear, the card/key sends a "MEMORY ALL CLEAR CODE" to the remote computer, and waits for acknowledgment (step 966). If the central computer acknowledges, in step 968, the card/key is authorized to finalize the transaction clear (step 970); otherwise, resetting of the card/key memory is aborted in step 972.

Finally, an End of Procedure code is transmitted by the seller unit to the remote computer (step 972) and communication is terminated. A confirmation message is then displayed at the buyer unit. The cardholder now removes the card.

Eventually, the cardholder will receive an itemized statement from the authorizing institution, with the transaction details, together with account balance itemized.

(5) Conclusion

There has thus been described a system for providing electronic funds transfer between portable modules of a seller and buyer via at least one facsimile machine. The system is operative selectively in (1) an off-line mode wherein funds data are transferred between modules at a common facsimile machine, (2) an on-line mode wherein funds data are transferred between modules at different transaction sites over the telephone lines via two facsimile machines and (3) an upload or clearing mode wherein funds data are transferred to a central computer for reconciliation. In the transaction modes (1) and (2), facsimile signatures of the buyer and seller obtained from the modules, together with transaction data obtained from the modules and keyboard entered, are printed by the facsimile machine printer to form transaction records. Microprocessor circuitry is programmed to control the operation of the system, including carrying out particular functions such as deferring the time of transaction, updating account records and security.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. An electronic funds transfer system for carrying out financial transactions between local or remote users, comprising:
   a portable identification module having an information storage means therein, said information storage means storing first data corresponding at least to a vendor/vendee identification number, transaction amounts, transaction times, an account balance and a vendor/vendee signature;
   a facsimile machine comprising first means including a document printer for printing data on a recording medium, input means including a keyboard for receiving second data manually entered thereon, said facsimile machine further including means for formatting said first and second data, means for transmitting formatted data via a communication medium to other ones of said facsimile machine, said formatted data including text and graphics data, means for receiving formatted data incoming on said communication medium from said other ones of said facsimile machine and means for printing on said recording medium in formation including vendor/vendee signature corresponding to said formatted data;
   interface means incorporated with said facsimile machine for receiving said identification module, said interface means including means for writing said second data to and reading said second data from said module; and
   processor means in circuit with said keyboard and said interface means for carrying out vendor/vendee transactions, said processor means including means for coupling said first and second data to said formatting means and for updating said first data stored in said storage means in accordance with said transactions.

2. The system of claim 1, wherein said module includes an integrated circuit therein for storing said first data.

3. The system of claim 1 or 2, wherein said module is in the form of a mechanical key and said interface means includes a key receptacle for enabling a transaction mode of operation of said facsimile machine.

4. The system of claim 2, wherein said integrated circuit includes an EEPROM.

5. The system of claim 1, wherein said interface means comprises a receptacle for receiving said module, electrical contacts in said receptacle positioned to electrically interconnect with corresponding contacts on said module.

6. The system of claim 5, wherein said interface means comprises a pair of receptacles for receiving two of said modules.

7. The system of claim 6, wherein said interface means includes processor means coupled to said receptacles and responsive to said keyboard for transferring said first and second data bidirectionally between said two modules.

8. The system of claim 7, wherein said processor means further includes means responsive to said first and second data for controlling said printing means to print a transaction record comprising at least a transaction amount, transaction date and vendor/vendee signatures.

9. The system of claim 7, wherein said processor means is programmed to be operative selectively in (a) a local mode for transferring said first and second data between said two modules in said pair of receptacles within said facsimile machine, (b) a remote mode for transferring said first and second data between modules within receptacles of different facsimile machines and (c) an upload mode for transferring said first and second data from a module within a receptacle of said facsimile machine to a remote computer.

10. The system of claim 9, wherein said processor is further programmed to be operative in an interrogation mode wherein data stored in said storage means, corresponding to transactions previously completed, are printed by said document printer.

11. The system of claim 1, including means for storing transaction data corresponding to a desired transaction and a desired time of transaction, a clock for indicating real time, comparison means for comparing real time and the desired transaction time and means responsive to said comparison means for carrying out the desired transaction at the desired time.

12. The system of claim 1, wherein said communication medium comprises telephone lines.

13. The system of claim 12, wherein said transmitting means includes an asynchronous serial communications interface coupled to said telephone lines.

14. The system of claim 1, wherein said interface means further includes means for reading a requested transaction amount keyboard entered by a vendee, and in response, authorizing said transaction only if the account balance stored in said storage means is larger than said requested transaction.

15. The system of claim 1, including means for reducing the account balance stored in said storage means by the amount of a completed transaction.

16. The system of claim 1, wherein said storage means further includes means for storing account numbers and for storing corresponding account number abbreviation codes, said interface means including means for reading out an account number in accordance with its abbreviation code keyboard entered by a vendor/vendee.

17. For a facsimile machine comprising a document reader for reading text and graphics data from a document provided thereto, a document printer for printing data on a recording medium, a keyboard for receiving and encoding first data manually entered thereon, means for formatting data received from said document reader and said keyboard, means for transmitting said formatted data via a communication medium to other facsimile machines, means for receiving formatted data incoming on said communication medium from said other facsimile machines and printer means for printing on said recording medium text and graphics information, an improvement for carrying out vendor/vendee transactions comprising:

receiving means incorporated with said facsimile machine for receiving a vendor/vendee identification module, said receiving means having means for writing data to and reading data including a vendor/vendee signature from said module; and processor means in circuit with said keyboard and said receiving means for carrying out vendor/vendee transactions, comprising means for determining whether a transaction requested via the keyboard is an authorized transaction, means for coupling data including said vendor/vendee signature carried by said identification module to said formatting means, means for updating said data carried by said identification module in accordance with said authorized transaction, means for generating transaction data associated with said authorized transaction and means for transmitting said transaction data to another facsimile machine.

18. The improvement of claim 17, wherein said receiving means comprises a receptacle in said facsimile machine for receiving said identification module.

19. The improvement of claim 18, wherein said receiving means further includes a receptacle configured to receive an identification module in the form of a mechanical key.

20. The improvement of claim 19, including retaining means within said receptacle for capturing said key and means responsive to keyboard entered data for releasing said retaining means.

21. The improvement of claim 19, wherein said mechanical key contains an integrated circuit and said processor means includes means for transferring data bidirectionally with respect to said integrated circuit.

22. The improvement of claim 17, including a clock means for real time signal, and said processor means including means responsive to said real time signal and keyboard entered data for carrying out said authorized transaction at a predetermined real time.

23. The improvement of claim 17, wherein said processor means includes means for storing a queue of authorized transactions and for carrying out said queue of authorized transactions, one authorized transaction at a time.

24. The improvement of claim 17, wherein said processor means includes means responsive to said identification module for storing vendor/vendee account numbers, transaction authorization codes and, in an encoded form, said vendor/vendee signature.

25. The improvement of claim 24, including modem means for transmitting formatted data on said communication medium and wherein said processor means further includes means for encoding said vendor/vendee signature into serial format data for transmission by said modem.

26. The improvement of claim 24, wherein said receiving means comprises a card reader.

27. The improvement of claim 17, wherein said receiving means comprises first and second receptacles for receiving respectively first and second identification modules.

28. The improvement of claim 17, wherein said receiving means further includes means external to said facsimile machine for receiving a second identification module, and wherein said processor means includes means for establishing bidirectional communications between said identification modules.

29. The improvement of claim 27, wherein said processor means is programmed to be operative selectively in (a) a local mode for transferring data between said two modules in said first and second receptacles within said facsimile machine, (b) a remote mode for transferring data between modules within receptacles of different facsimile machines and (c) an upload mode for transferring data from a module within a receptacle of said facsimile machine to a remote computer.

30. The improvement of claim 17, wherein said processor means is programmed to control said printer means to print a transaction record in accordance with transaction data obtained from vendor and vendee identification modules, said transaction record including vendor and vendee signatures obtained from said vendor/vendee identification modules.

* * * * *